(12) United States Patent
Bodeman

(10) Patent No.: US 8,694,384 B2
(45) Date of Patent: Apr. 8, 2014

(54) SEARCH ENGINE SYSTEM AND METHOD USING DIRECTORIES OF PRODUCTS AND SERVICES FOR FACILITATING SUPPLY CHAIN INTEGRATION AND COMMUNICATION

(76) Inventor: Luis A Crocchi Sapin Bodeman, West Palm Beach, FL (US)

( * ) Notice: Subject to any disclaimer, the term of this patent is extended or adjusted under 35 U.S.C. 154(b) by 298 days.

(21) Appl. No.: 12/796,325

(22) Filed: Jun. 8, 2010

(65) Prior Publication Data
US 2011/0137747 A1 Jun. 9, 2011

Related U.S. Application Data

(60) Provisional application No. 61/185,237, filed on Jun. 9, 2009.

(51) Int. Cl.
*G06Q 30/00* (2012.01)
(52) U.S. Cl.
USPC ......................................................... 705/26.1
(58) Field of Classification Search
USPC ......................................................... 705/26.1
See application file for complete search history.

(56) References Cited

U.S. PATENT DOCUMENTS

2006/0277086 A1* 12/2006 Ball et al. ......................... 705/8
2011/0225062 A1* 9/2011 Scott et al. .................... 705/26.4

OTHER PUBLICATIONS

United States Department of Labor, Standard Industrial Classification (SIC) System Search, www.osha.gov/pls/imis/sicsearch.html, May 20, 2009.
NIGP Code, The NIGP Commodity Code offers an excellent coding structure for standardizing purchasing. It is a natural fit with date warehousing and decision support reporting,www.nigp.com, May 20, 2009.
UNSPSC, The United Nations Standard Products and Services Code (UNSPSC) provides an open, global multi-sector standard for efficient, accurate classification of products and services, www.unspsc.org, May 20, 2009.
GTIN, Global Trade Identification Number, GTIN describes a family of GS1 (EAN.UCC) global data structures that employ 14 digits and can be encoded into a various types of data carriers,www.gtin.info, May 20, 2009.
Global Location Number (GLN) Implementation Guide, The GLN (Global Location Number) provides a standard means to identify legal entities, trading parties and locations to support the requirements of electronic commerce, www.uc-council.org/ean_ucc-system, May 2002.

* cited by examiner

*Primary Examiner* — Mila Airapetian
(74) *Attorney, Agent, or Firm* — Robert C. Kain, Jr.

(57) ABSTRACT

The method and system manages supply chain purchases of goods and services (G-S) using a distributed computer system coordinating interested customers with vendors who offer G-S. The system uses a database or accesses a vendor's database having default offer records which include G-S descriptions, price, payment terms, delivery data, and set-aside parameters. A sophisticated system includes customer specific offer records for approved customers with specific price, payment, delivery and set-aside parameters. Customers search the database, and if previously registered and accepted by the vendor, the customer can reserve a defined quantity of G-S in accordance with set-aside parameters, request a quote, and/or purchase G-S from the vendor. Further, the system rates the vendor and the customer based upon timely performance of, for the customer reservation followed by purchase of G-S within the defined quantity, and for the vendor, timely delivery of G-S and timely notice of customer acceptance.

20 Claims, 16 Drawing Sheets

SEARCH ENGINE SYSTEM AND METHOD USING DIRECTORIES OF PRODUCTS AND SERVICES FOR FACILITATING SUPPLY CHAIN INTEGRATION AND COMMUNICATION

The present application is a regular patent application based upon and claiming the benefit of provisional patent application Ser. No. 61/185,237, filed Jun. 9, 2009, the contents of which are incorporated herein by reference thereto.

The present invention is directed to providing a method, apparatus and system for (A) providing a unified directory of products and services under a set of common global attributes like UNSPSC (the United Nations Standard Products and Services Code), EAN (European Article Number code), GTIN (the Global Trade Identification Number), ISO (International Organization for Standardization), GLN (the Global Location Number Implementation Guide), and local standardization like SIC (the Standard Industrial Classification (SIC) System, United States Department of Labor), ABNT (Brazilian Association of Technical Standards), IRAM (Instituto Argentine de Mormalizcion code); (B) providing an Internet based search engine enabling registered and non registered users to search for product and services using the above mentioned global and local set of attributes; (C) providing an Internet based message service intermediation for businesses, professionals and consumers enabling business transactions like quotations, withholdings (reservations or set-asides), service withholdings and purchases for the purpose of facilitating supply chain integration and communication; (D) providing a method for qualifying and rating businesses, professionals and customers based on successful completion of transactions and requests; and, (E) providing a method for executing marketing campaigns, discount promotions and launching new products or services among registered businesses, professionals and individuals.

Further, the present invention relates to an improvement of supply chain automation and coordination, providing processes and a data model that standardizes a plurality of product and services description attributes used by suppliers (vendors) and buyers to allow the automation of quotation, withholding and purchasing processes. The processes defined in this invention improves the communication in business transactions communication and the coordination between disperse suppliers and buyers, as well as allowing buyers to locate with accurate criteria product and services in order to establish a new commercial relationship.

BACKGROUND OF THE INVENTION

The Internet evolution experienced in recent years has been primarily focused on social network interaction, business to consumer shopping, media and news publishing, and business advertising through company web sites. As the Internet has a deep integration with daily activities, it is becoming the main media or transport for parties communication and it is reasonable to imagine an increasingly evolution to a total digital integration. From social integration perspective, it is clearly underway, however from business perspective, improvements should be made beyond existing business communication.

Although Internet business to business (B-to-B) interaction improved along these years, a simplified model of processes and data has not emerged as a leader to improve productivity, enhance interaction, improve production planning, to include services in similar way as products, and enabling market interaction across vertical sectors. Business interaction continues being executed through email communication, phone calls, faxes and other paper media.

OBJECTS OF THE INVENTION

It is an object of the present invention to provide a supply chain management (SCM) computer system for customers and vendors, wherein the customers may be businesses seeking to purchase goods or services from other businesses or members of the public (customers) seeking to purchase goods or services from businesses. Sometimes sellers (businesses) are called vendors or suppliers.

It is another object of the present invention to provide a rating system to determine the integrity and quality of the customer as well as the integrity and quality of the vendor.

It is an object of the invention to provide a series of processes, supported by Internet based technology, that enables disperse suppliers to register products and services in a centralized directory/catalog, with a standard categorizations like UNSPSC, GTIN, VCC, EAN, SIC, and model number or country based product and service standardization with the purpose of facilitating an accurate search of desired product/service.

The invention also provide a series of Internet based processes that enable disperse buyers to find manufacturers or sellers of specific product and/or service, facilitating and automating price quotations, product or service withholding or reservation, and product/service purchase using an Internet based message system.

It is another object of the invention to provide a method and computer process to rank a seller's efficiency on successfully completing quotation, withholding and sales processes, and a method to rank a buyer's effectiveness on pursuing withholdings or purchase processes. The Internet process registers a buyer's satisfaction of price per value for the purchased product/service.

It is a further object to provide a method, processes and data model also enables B2C and B2B sellers to define and execute marketing campaigns for their product or services using registered users database and supported by the inventive message system.

SUMMARY OF THE INVENTION

The computerized method and system manages supply chain purchases of goods and services (G-S) using a distributed computer system coordinating interested customers with vendors who offer G-S. The system uses a database or accesses a vendor's database having default offer records which include G-S descriptions, price, payment terms, delivery data, and set-aside parameters. A sophisticated system includes customer specific offer records for approved customers, approved by the corresponding specific vendor, and these customer specific records include specific price, payment, delivery and set-aside parameters. Customers search the database, and if previously registered and previously "accepted" by the vendor, the customer can reserve a defined quantity of G-S in accordance with the vendor's set-aside parameters for the G-S, request a quote, and/or purchase G-S from the vendor. The reserved G-S are temporarily withheld by the vendor for the designated customer. A further enhancement to the system includes a vendor and a customer rating module. The system rates the vendor and the customer based upon timely performance of several commercial events. For the customer, the system rates customer reservation of G-S followed by purchase of G-S within the defined quantity, and for the vendor, the system rates the vendor based upon timely delivery of G-S and timely notice of customer acceptance.

BRIEF DESCRIPTION OF THE DRAWINGS

Further objects and advantages of the present invention can be found in the detailed description of the preferred embodiments when taken in conjunction with the accompanying drawings in which.

DETAILED DESCRIPTION OF THE PREFERRED EMBODIMENTS

The present invention relates to a method and a system for searching directories of products or services (G-S) and for facilitating supply chain integration and communication. Similar numerals designate similar items throughout the drawings. The Abbreviations Table, at the end of this specification, lists some abbreviations which are useful in understanding the drawings and the descriptions of the system herein.

Figure 1:
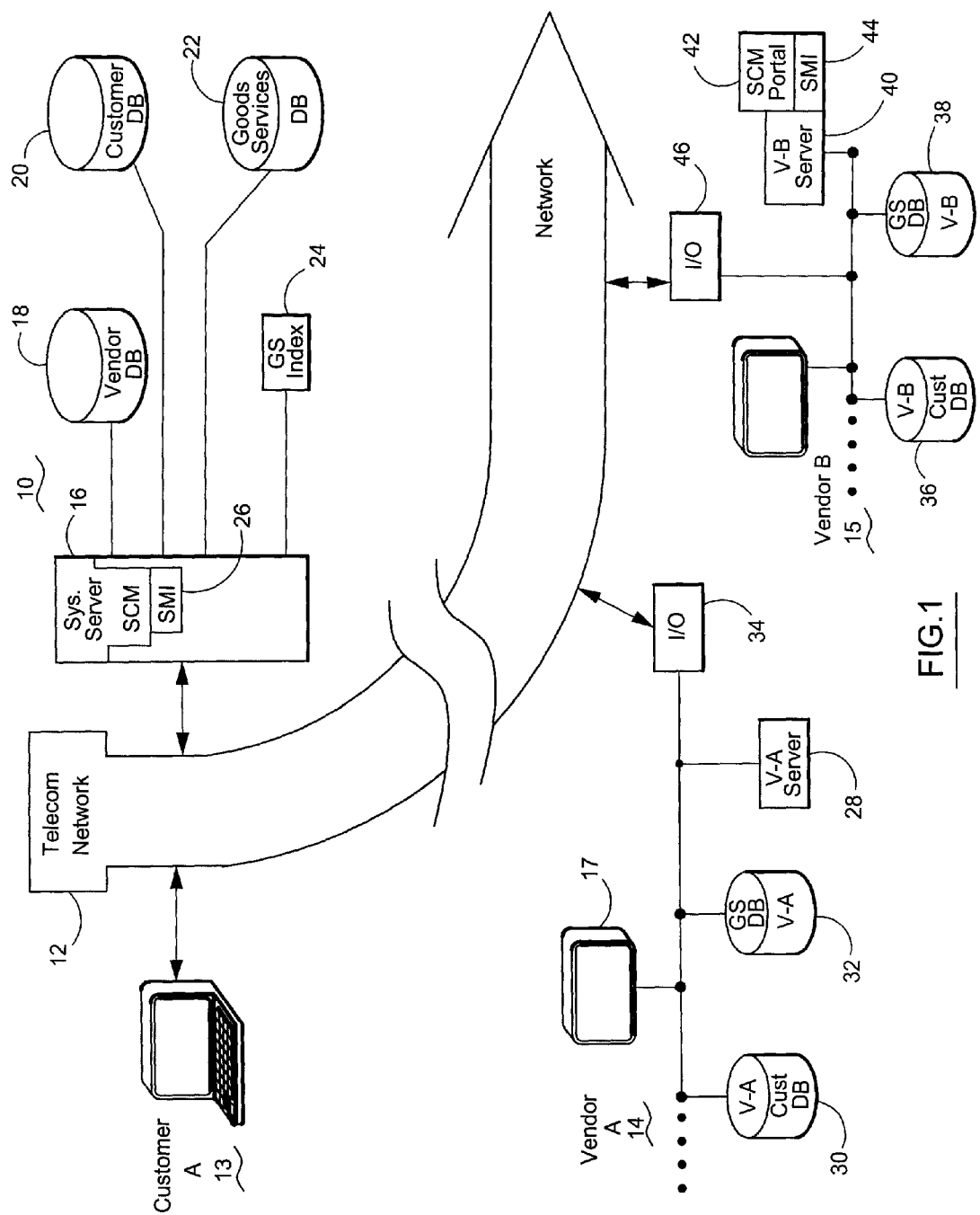
FIG. 1 diagrammatically illustrates a distributed computer system which provides the operating platform of the supply chain management SCM system and method.

FIG. 1 diagrammatically illustrates the supply chain management system 10 which is operatively coupled to a telecommunications network 12 (which may include the Internet) to various client computers such as customer A client computer 13, vendor A computer 14 and vendor B computer system 15. The supply chain management system 10 includes a processor, which is generally designated as the system server for supply chain management (SCM). SCM Server 16 includes a systems management interface SMI 26. SMI 26 interacts with telecommunications network 12 and generally provides the interface between server 16 and various customers as well as various vendors. Processor server 16 is coupled to a vendor database 18, a customer database 20 and a goods and services database 22. In some instances, a specific vendor will maintain control over the goods and services database sold by that vendor. This is discussed later in connection with vendor B. In this instance, supply chain management system 10 includes a goods and services index 24 which provides a quick link to the vendor's database of goods and services. The vendor may control and possess the vendor's customer database in the same manner.

Vendor A computer system 14 includes a number of computers, one of which is client computer 17 as well as a vendor A server 28 and a vendor A customer database 30 and a goods and services G-S database 32 for vendor A. The vendor A server 28 is coupled to telecommunications network 12 via input/output (I/O) module 34. Currently, a single product-service database at SCM DB 22 is utilized.

With respect to vendor B computer system 15, vendor B has server 40 and customer database 36 and G-S database 38. Operating in connection with vendor server 40 is a supply chain management portal 42 having all or a portion of the system management interface 44. I/O 46 enables SMI 44, in conjunction with SCM portal 42, to be able to quickly deliver to SCM server 16 a detailed page for a good or service sold and offered by vendor B to either a business or consumer (see customer A). Customer records made be similarly processed. In other words, the supply chain management system and method can be operative solely in connection with databases at the SCM system 10 or the system may be more distributed and call up product data from one or more vendor databases 30, 38 with the utilization of G-S index 24 (part of system 10). When the vendors maintain control over the product data sheets, sometimes referred to herein as the default offer record for the G-S, the vendor can quickly change the parameters for that product without directly changing the data on G-S database 22 which is part of SCM system 10. Although a distributed database 22, 32, 38 is described, the current embodiment contemplates a singular SCM goods and services database 22 with all G-S records therein.

Figure 2:
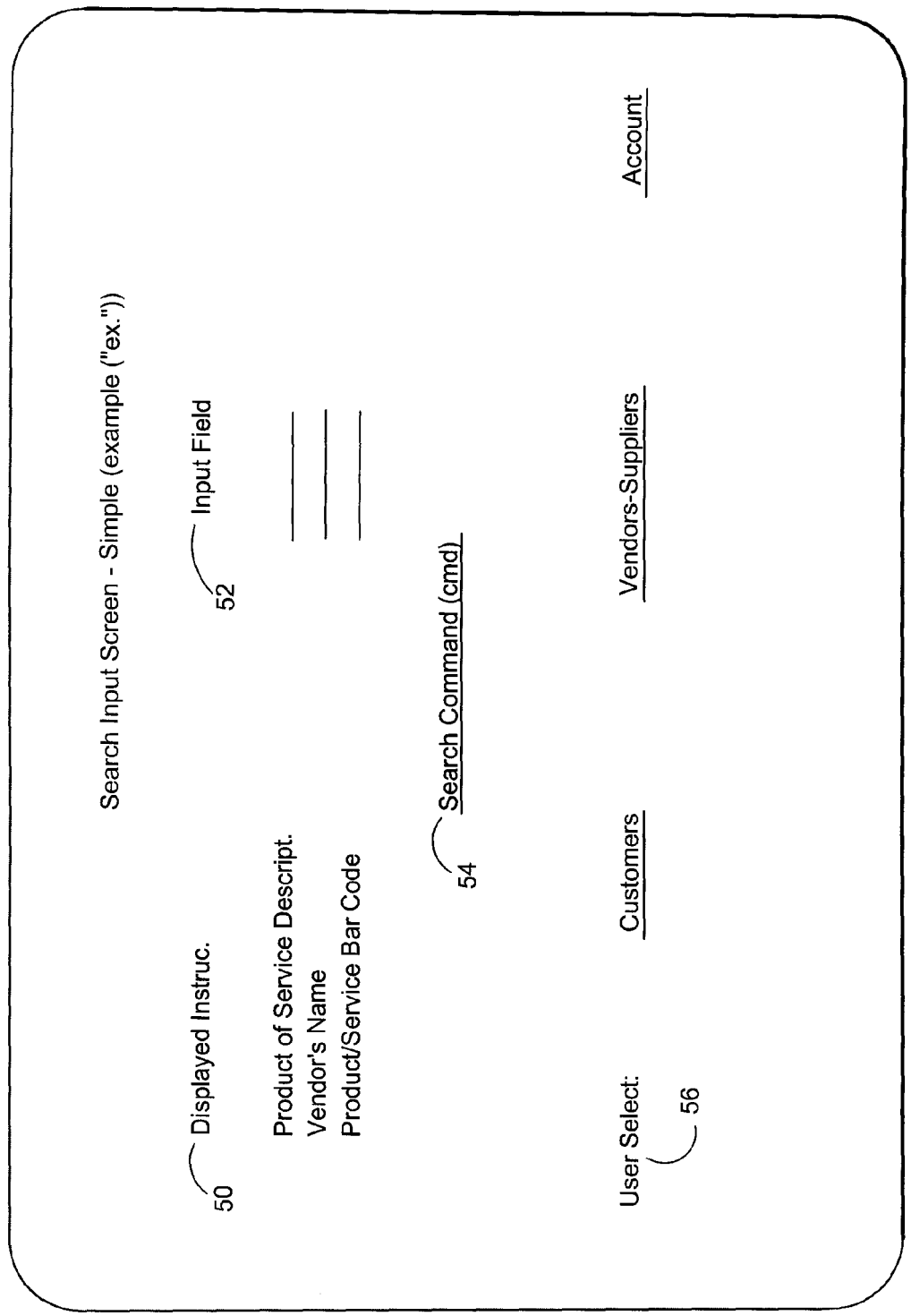
FIG. 2 diagrammatically illustrates a simple search input screen (the input screen generated by the system server to collect data from customer client computers)

FIG. 2 diagrammatically illustrates a simple search screen. As discussed later in connection with FIGS. 6-12, the customer accesses the SCM system 10 by requesting a search for a goods or service (G-S). FIG. 2 describes as simple search screen. Area 50 displays the instructions requesting an input into input field 52 of a product or service description (a simple search string) such as a brand name or a description of the product, for example, house paint, the brand owner or vendor's name or the product or service bar code. The bar code could be SKU or other product number. The user has the ability to input one or more of these search string requests or inquiries into the appropriate section of input field 52. The user has the ability to activate a search command 54 cmd. The user has a selection of commands enabling the user to directly advance to a customer profile input or member profile display screen, a vendor or supplier profile, or enables the user to check the user's account. The user's account contains withholding G-S data, quotes and purchases in progress and historic data.

Figure 3:
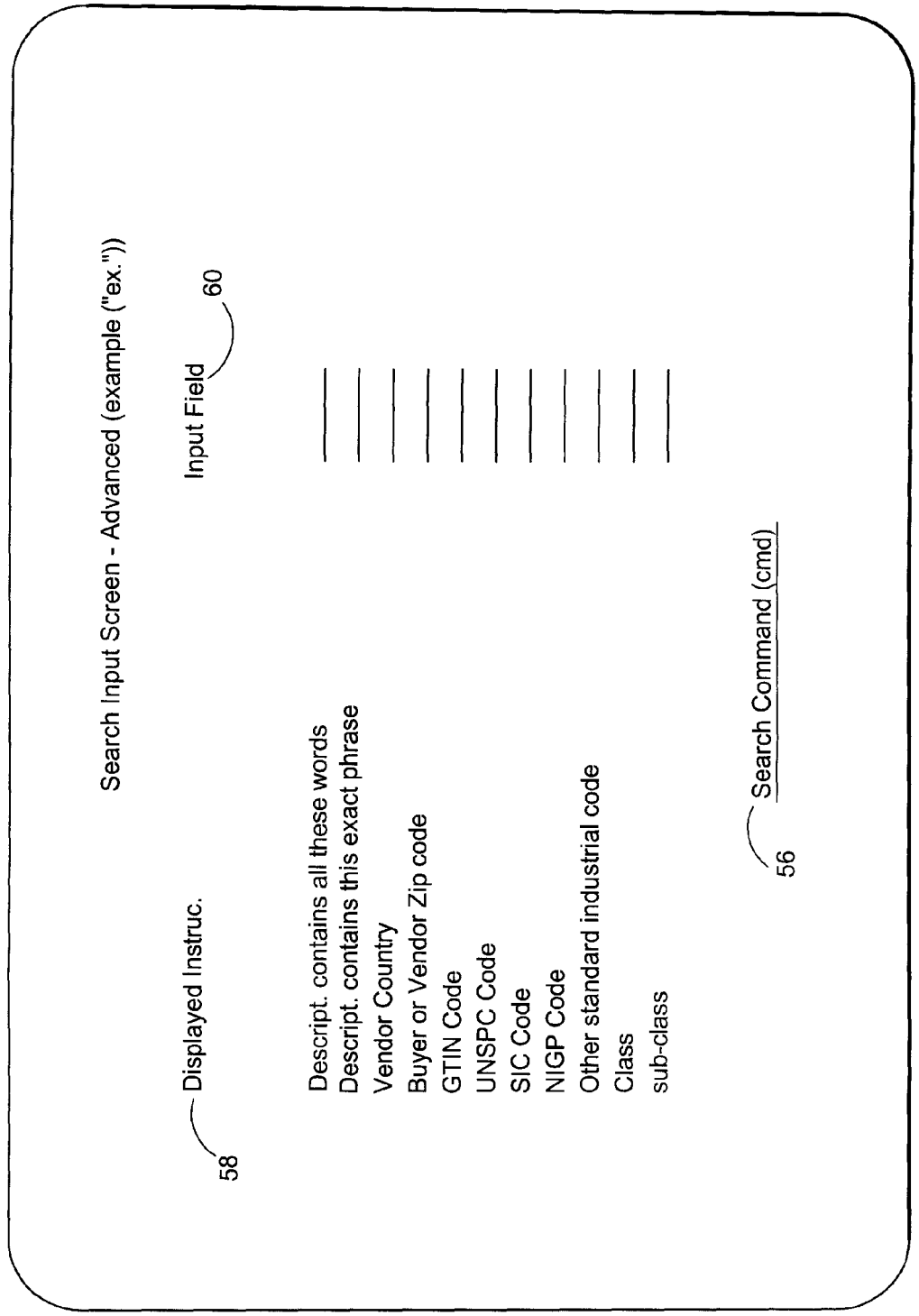
FIG. 3 diagrammatically illustrates an advanced search input screen.

FIG. 3 diagrammatically illustrates an advanced search input screen. The instruction field 58 and input field 60 includes input areas for description of any or all terms describing the product or service, or a description of the exact phrase ("house paint"), the country of the vendor, the buyer's zip code or the vendor's zip code, various product codes GTIN, UNSPC, SIC, or NIGP, or other standard industrial codes. System 10 includes a product code concordance table to translate one G-S code to a vendor supplied G-S code. See G-S database 22 and index 24. Additionally, the user may input a class or subclass for a particular product. Search command 56 enables the user to activate the search functions and SCM system 10. Further, the advanced screen includes user selection hot button links to customers, vendors, and account data screens as indicated above in FIG. 2.

Figure 4:
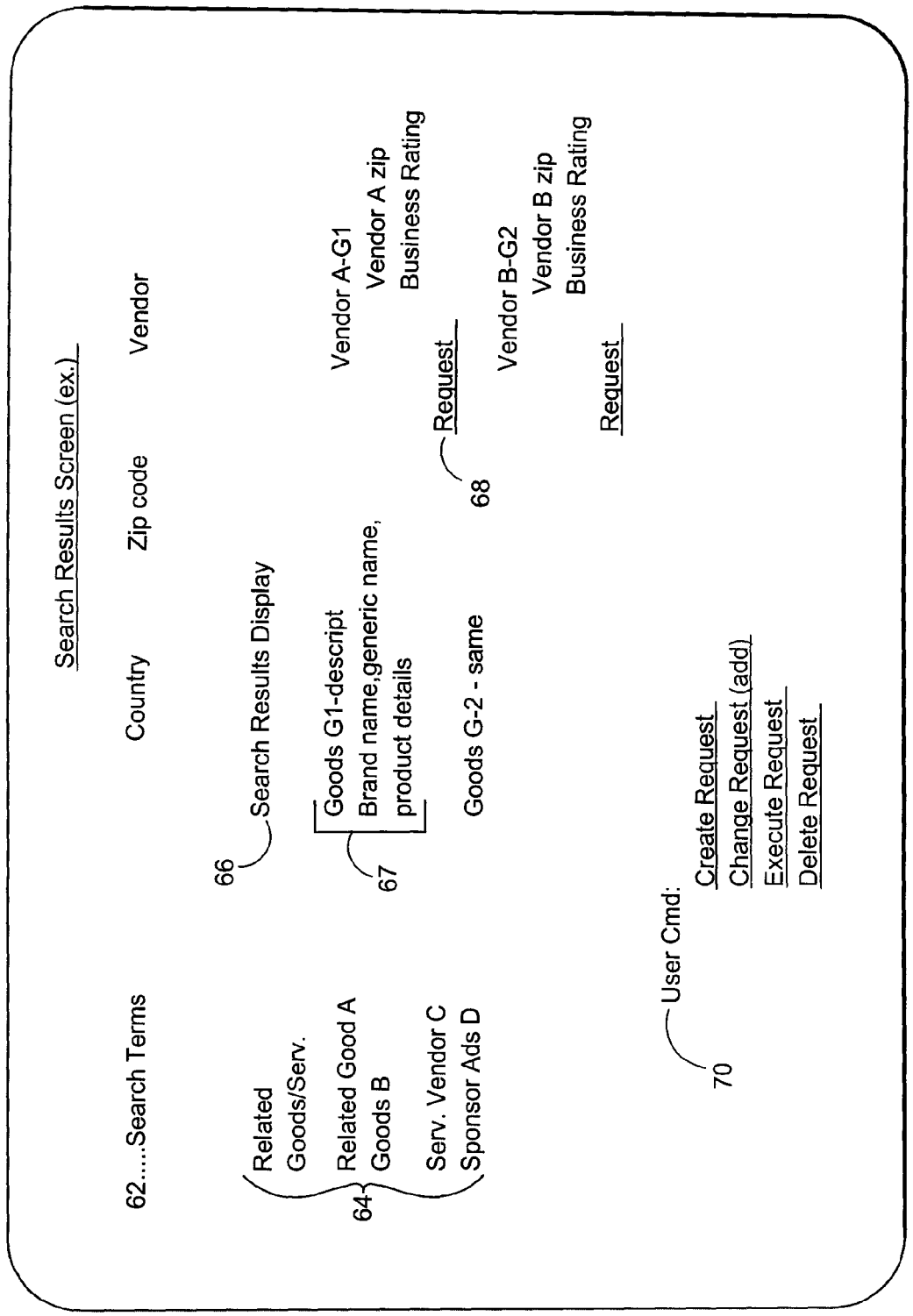
FIG. 4 diagrammatically illustrates a search results screen.

FIG. 4 diagrammatically illustrates a sample of a search result screen. Line 62 repeats the search terms earlier input by the user and shows the country selected by the user and the zip code selected (or not selected) by the user. The country and zip code may be automatically filled as a default by the SCM system 10 by monitoring the Internet protocol (IP) address of the user. It is well known that the user's IP address gives an indication of the geographic location of the user. The term "user" herein refers to either the vendor or a customer seeking an inquiry into the SCM system 10. Area 64 in FIG. 4 shows related goods or services as compared with the specific G-S shown in search result display area 66. For example, if the search result display 66 shows "house paint by Target" then related goods and services area 64 may show related good A, a paint brush, related good B, a paint hat, and service vendor C, a painting contractor, as well as sponsored ads by vendors D. Of course, the related G-S area 64 may be configured in any reasonable manner. Search result display 66 includes a short description area 67 of goods G1. The short description may include the brand of goods G1, the generic name of the goods and a short product detail. Search result display 66 also includes goods G2 which is the supplemental search result data from the search term input by the user as noted in FIGS. 2 and 3 above. These G-S details are obtained from a default G-S offer record in SCM G-S database 22 or gathered from vendor G-S databases 32, 38.

Detailed good description 67 includes a vendor A of good G1, as well as the zip code of vendor A and the business rating for vendor A. The business rating of the vendor is discussed later herein. User actuated function 68 provide that the user may "request" further details on the product with a short description in area 67. Below area 67 is a short description of goods G2 from vendor B showing vendor B zip code, vendor B business rating and the user actuatable "request" field. In addition, the user has a command region 70 which permits the user to activate a function (fnc) called create request, change request (such as adding the goods to a virtual shopping cart), execute request or delete request. These functions may be used in connection with the processes in FIGS. 6-12.

Figure 5:
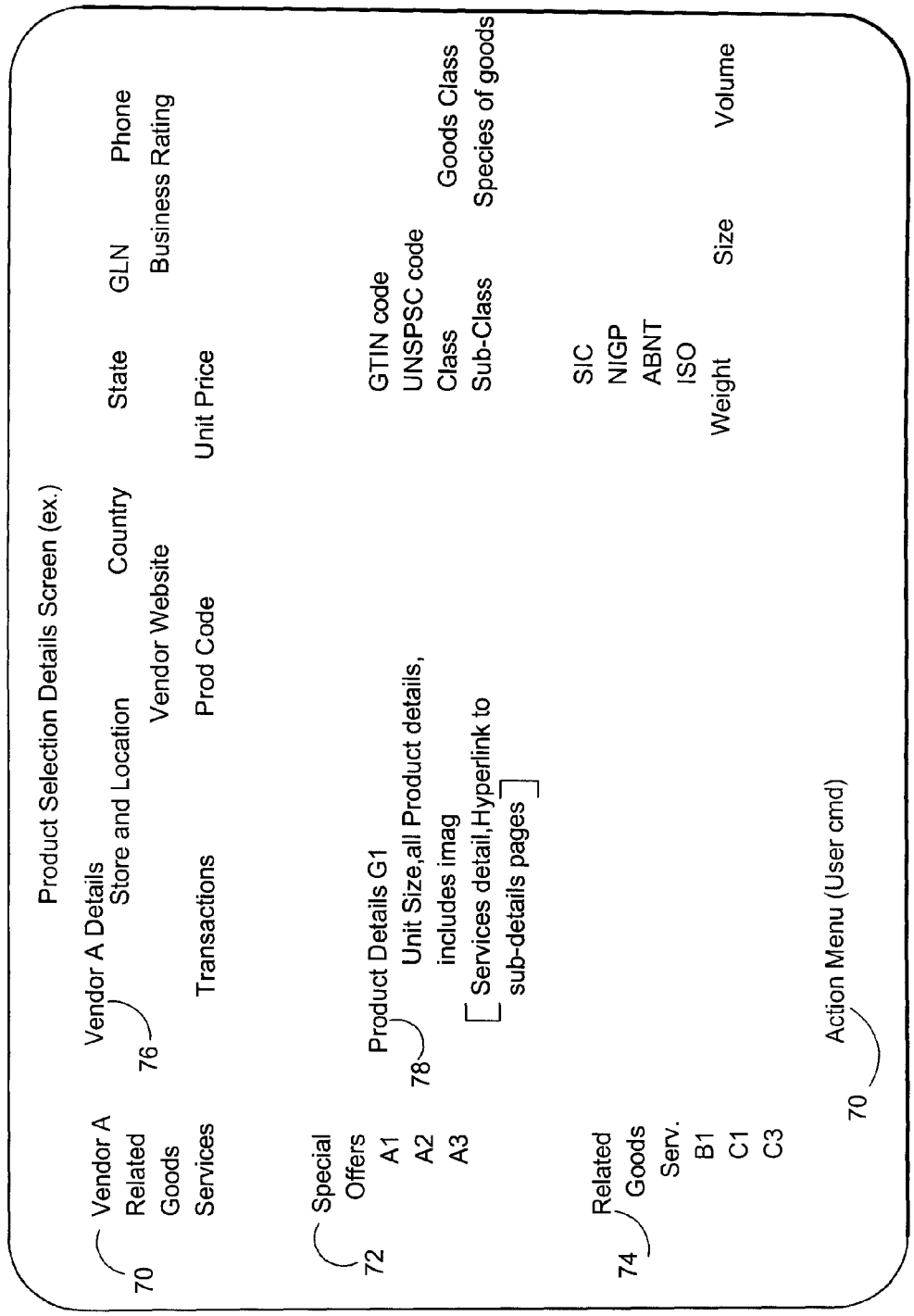
FIG. 5 diagrammatically illustrates a product selection details screen.

FIG. 5 shows a sample of a product selection detail screen. This screen shows many more details for the product G1 which was earlier selected by the user in FIG. 4. On the left hand side, area 70 shows the vendor A related goods and services. Special offer region 72 shows discount or associated items A1, A2 and A3. Related goods-services area 74 shows vendors who supply services to the user such as services vendor B1, services vendor C1 and services vendor C2. The product detail screen is generally broken into vendor display area 76 and product detail area 78. Vendor detail area 76 includes all reasonable details regarding vendor A including the store, the location, country, state and standard code GLN as well as the phone number. Vendor A website is displayed along with vendor A's business rating. The current transaction is shown as well as the product code and the unit price. Product area 78 lists greater details on product G1 including the unit size, a detailed description of the product, and potentially an image of the product. If a service is offered rather than a product, the detail of the service may have embedded hyperlinks therein for describing sub services associated with the general services (for example, general "home renovation" service includes "roofer," "house painter" and "plumber"). On the right hand side of the product detail screen, various codes are provided describing the goods G1 and the class and subclass and all the complementary product codes. The weight, size and volume of the goods G1 is also shown. On the lower portion of the screen, the user is presented with action menu 70 which is a series of user commands cmd similar to user command 70 in FIG. 4. Delivery cost data may be displayed. Reservation or withholding parameters may be displayed to assist the buyer.

General Processes Summary

Figure 6:
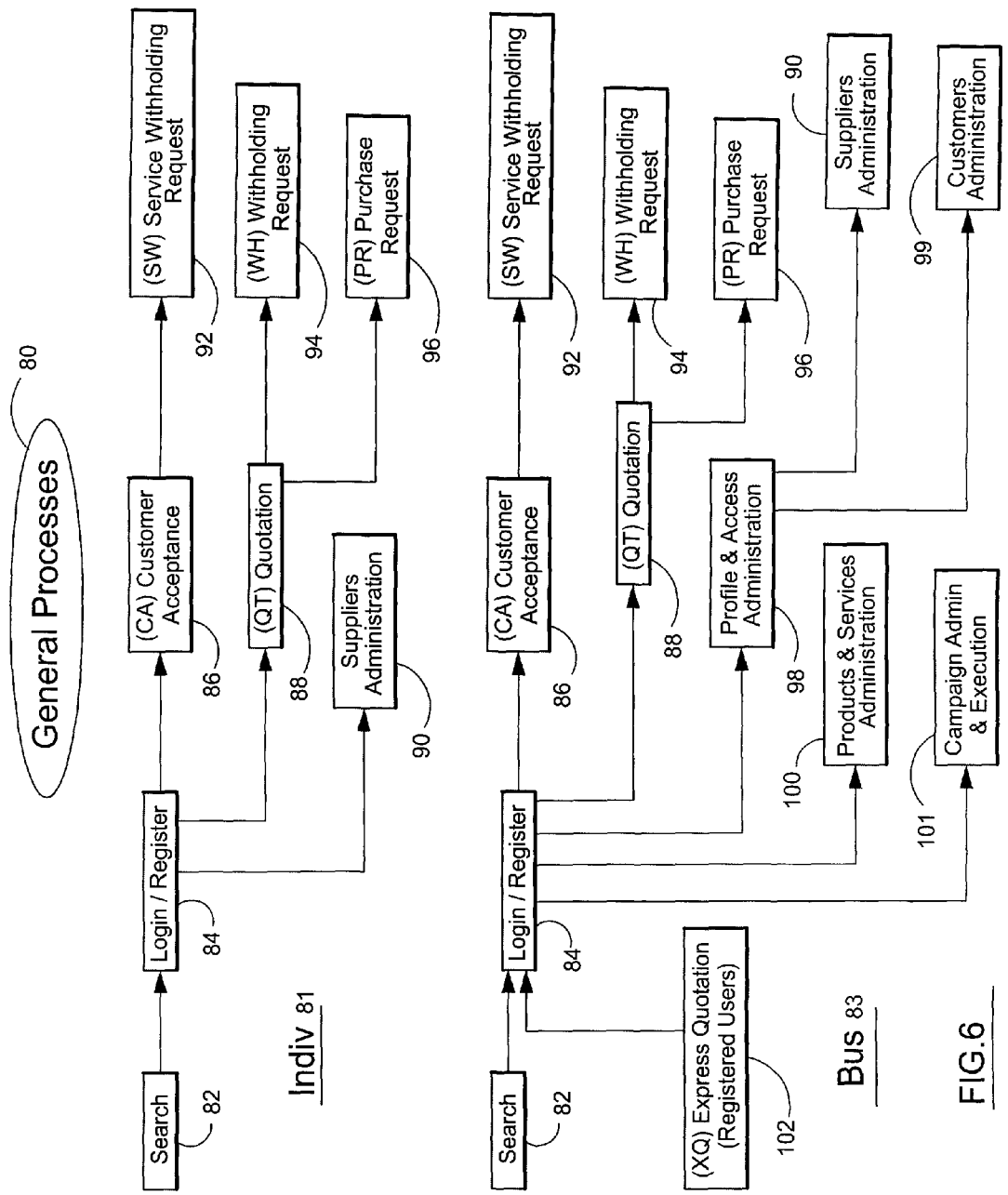
FIG. 6 diagrammatically illustrates a flowchart and process modules showing the general processes for the supply chain management program and system.

This is a summary of the general processes in FIG. 6. Features and functions from all summaries may be incorporated into the detailed descriptions which follow each major function. Search Advanced Search 82. Defining and executing search criteria using different attributes like UNSPSC, GTIN, ISO and words included as part of product & services definitions.

Registration 84. Actions necessary to become a member of search engine web site that enable usage of services offered by this specific product and services Internet search engine. (CA) Customer Acceptance Request 86. Internal search engine functionality which enables a registered entity (Individual, Professional, Business company, NPO (non-profit organization), or Gov (governmental unit)) to request to a destination vendor entity (professional or business) to become a customer of the destination entity. (SW) Service Withholding Request 92. Internal search engine functionality which enables an existing entity (Individual, Professional, Business, NPO or Gov), to request to a destination entity (professional or business) to withhold and reserve specific G-S given/offered by destination entity (vendor) for a certain date. (QT) Quotation 88. Internal search engine function which enables an existing entity (Individual, Professional, Business, NPO, or Gov), to request from a destination entity (Professional or Business) a quotation, price or cost for the listed product and/or service included as part of mentioned quotation transaction. These products and services are registered/offered by destination entity and entered into the search engine web site database. (WH) Withholding Request 94. Internal search engine functionality which enables an existing entity (Individual, Professional, Business, NPO, or Gov), to request to a destination entity (professional or business) to withhold or reserve for the listed product and/or service. These products and services are registered/offered by destination entity and made available via the search engine web site database.

(PR) Purchase Request 96. Internal search engine functionality which enables an existing entity (Individual, Professional, Business, NPO, or Gov) to request from a destination entity (professional or business) the reservation and sale to requester entity of a listed product and/or service included as part of mentioned purchase transaction. These products and services are registered/offered by the destination entity and are logged into search engine web site database. Profile & Access Administration 98. Internal search engine functionality which enables administrators of the registered entities (Professionals, Businesses) to administer web site entitlements for employees of those entities. Entitlements comprise the registration of users, enable specific activities and actions for that user with the purpose of generating, executing and completing transactions under that registered entity. Suppliers Administration 90. Internal search engine functionality which enables registered users from a registered entity (Individuals, Professional, Business) to manage pending request and manage activities and transactions related to existing or potential suppliers for that specific entity. Customers Administration 99. Internal search engine functionality which enables registered users from a registered entity (Professional, Business) to manage pending requests, and manage activities and transactions of existing or potential new customer entities (Individual, Professional, Business, NPO, Gov) for that specific entity.

Product & Services Administration 100. Internal search engine functionality which enables registered users from a registered entity (Professional, Business) to define, upload and manage product and services G-S information, attributes, and prices for the sole purpose of advertisement of products and services offered and/or sell through this search engine web site. This administration 100 maintains G-S databases and default G-S offer data (and customer specific data). Product and services are registered into search engine web site database. Campaign Administration & Execution 101. Internal search engine functionality which enables registered users from a registered entity (Professional, Business) to define, manage and execute marketing campaigns wherein a destined or selected list of registered entities (Individuals, Professionals, Businesses), are notified of a new offering of old or new products, new services, and/or special discounts, for products and services registered/offered by that entity through this search engine website. Express Quotation 102. Internal search engine functionality which enables registered users from a registered entity (Professional, Business) to create a quotation transaction on behalf of an existing or potential new customer, for the sole purpose of advertising products and/or services offered and/or sold through this search engine web site. New unregistered customers are prompted to register to get access to the new or discounted product (or services) offered from origination entity.

Type of Entities Using the System. (A) Individuals. Users registered as individuals will not advertise any product or services. Individual will be entitled to request withholdings or purchases from vendors such as Professionals or Business entities. (B) Professionals. Entities registered with the purpose of offering or advertising their professional services through this supply chain management SCM Search engine web site. Professionals, sometimes called "vendors," will also be entitled to withhold and purchase products and services to other Business entities and other Professional entities registered in web site database. (C) Businesses. Entities registered into this web site with the purpose of offering or advertising their G-S through this SCM Search engine web site. Business entities will also be entitled to withhold and purchase products and services from other Professionals entities or other Business entities registered in web site database. (D) Non Profit Organizations (NPO). Entities registered with this web site for the purpose of interacting with other entities for collecting donations, offering charity products like calendars, post cards, etc, and search for lower costs of supplies. (E) Government or Municipalities Organizations (Gov). Entities registered in this web site for the purpose of interacting with other entities in searching for lower costs of supplies.

Details of General Process

The general process in FIG. 6 is segmented into individual customer processes as compared with business customer processes. In practice, these processes may be merged into a singular functional routine. As noted later, the sequencing or steps and modules discussed herein may be rearranged to form a more efficient operation for the supply chain management. The sequences herein are an example of the SCM. Functions listed in the summaries may be incorporated into the detailed description. Since similar numerals designate similar items herein, in the individual process 81, the user initiates search 82 and, in the business segment 83, the user initiates search 82. The searches may include a search request from search input screens shown in FIGS. 2 and 3. Search result outputs are displayed thereafter. In both individual and business segments 81, 83, a log in or registration module 84 is noted. In either case, for new or unregistered users, the users must complete a profile and become a registered user. The registration system for a business vendor is much more extensive requiring input regarding geographic location of retail outlets, and for services the origination location for the service. Various contact persons may be noted in the business or vendor profile. For an individual, the customer profile is smaller but essentially covers the same aspects. An individual may be a small business or a sole proprietor. From log in 84 at individual segment 81, the system executes consumer acceptance CA module 86, quotation QT module 88 or suppliers administration 90. Major processes are discussed in detail later. From log in or registration 84 at business segment 83, the system executes consumer acceptance CA module 86, quotation QT module 88, profile and access administration module 89 for a vendor, products and services administration 100 for a vendor and campaign administration and execute mode 101, also for a vendor. Returning to individual segment 81 after customer acceptance 86, the user may request a reservation or set aside or withholding for a service by activating service withholding request module 92. From quotation module 88, the user may request a goods withholding from module 94 or may initiate a purchase event by activating purchase request module 96. With respect to business segment 84, from customer acceptance 86, the user may activate service withholding request 92. From quotation module 88, the user may engage withholding request module 94 or purchase request module 96. From profile and access administration 98, the user may activate supplier administration module 90 or customer administration 99.

As noted above in connection with FIG. 1, the SMI 44 in connection with vendor B computer system 15 may be utilized for customer administration. In connection with customer administration 99, vendor B may maintain most of the customer data in customer database 36. SCM portal 42 via SMI 44 may be activated and provide just a index which is loaded into customer database 20 at SCM system 10. In this manner, the vendor maintains a large degree of control over his or her customer data. Only small segments of that data are provided to SCM system 10 and customer database 20. The same distributed platform may be used for the G-S offer data records. System 10 may have a customer index similar to G-S index module 24. In another embodiment, customer database 20 operates in connection with SCM server 16, and maintains all the customer data. For example, vendor A may maintain all of his or her customer data in SCM system customer database 20. In this centralized operation, customer administration 99 utilizes a less intrusive SMI at vendor A. Essentially, vendor A on computer 17 has full access to his or her particular customer database 20 on SCI system 10 via telecom network 12.

The same general process is true regarding products and services administration module 100. In one centralized embodiment, SCM system 10 maintains a G-S database 22 which contains complete record copies of every good or service offered by vendor A. Different vendors have different records for the same product. Sometimes, these records for a particular vendor are called default offer records since the particular good or service is offered by vendor A and includes a description of the goods or services offered by vendor A, the price of the goods and services, or the unit price of the goods and services. G-S may be identical from vendor to vendor therefore some G-S records may be consolidated or compressed. General G-S data may be a single record but pricing may be vendor specific. The G-S default offer table is set forth later. Details of the G-S record include the number of units sold as a unitary package, the price, payment terms and conditions, information essential to complete delivery as well as set aside or reservation parameters for that particular G-S. Delivery data may include when the user may come to vendor A to collect the product or the service (withhold data) and may also include details to calculate the shipping of the goods from the vendor to the destination appointed by the user. SCM system 10 further includes a delivery computation module that calculates the delivery time and the cost of the delivery of the goods to the destination selected by the user. The particular profile completed by the user and the particular credit card or other payment process as well as the shopping cart contents and formats and the "bill to" data and "ship to" data are known by persons of ordinary skills in the art.

The campaign administration execution module 101 enables a particular vendor to compile information regarding a G-S which may be placed on special sale as well as establishing a mail and an email notification to a large number of potential purchasers (customers). That marketing campaign and execution module 101 may include sponsored search result ads discussed above in connection with the search screens as well email "sales" notices being delivered to targeted customers in customers database 20. To further enhance the campaign, vendor A may combine the customers in customer database 20 with vendor A customers in database 30. The campaign and execution module 101 encompasses the compilation of this customer data from both databases as well as the execution of a marketing program and the compilation of results from that program. These targeted customers may be contacted via email with a link going back to SMI 26 of SCM 16. Further, any registered user data in SCM database 20 may be used. If a customer has recently purchased a G-S, the SCM databases 20, 22 reflect this purchase. The market campaign gets transaction data (the previous vendor data being blocked out, as a blind search) and compiles the campaign.

Figure 7:
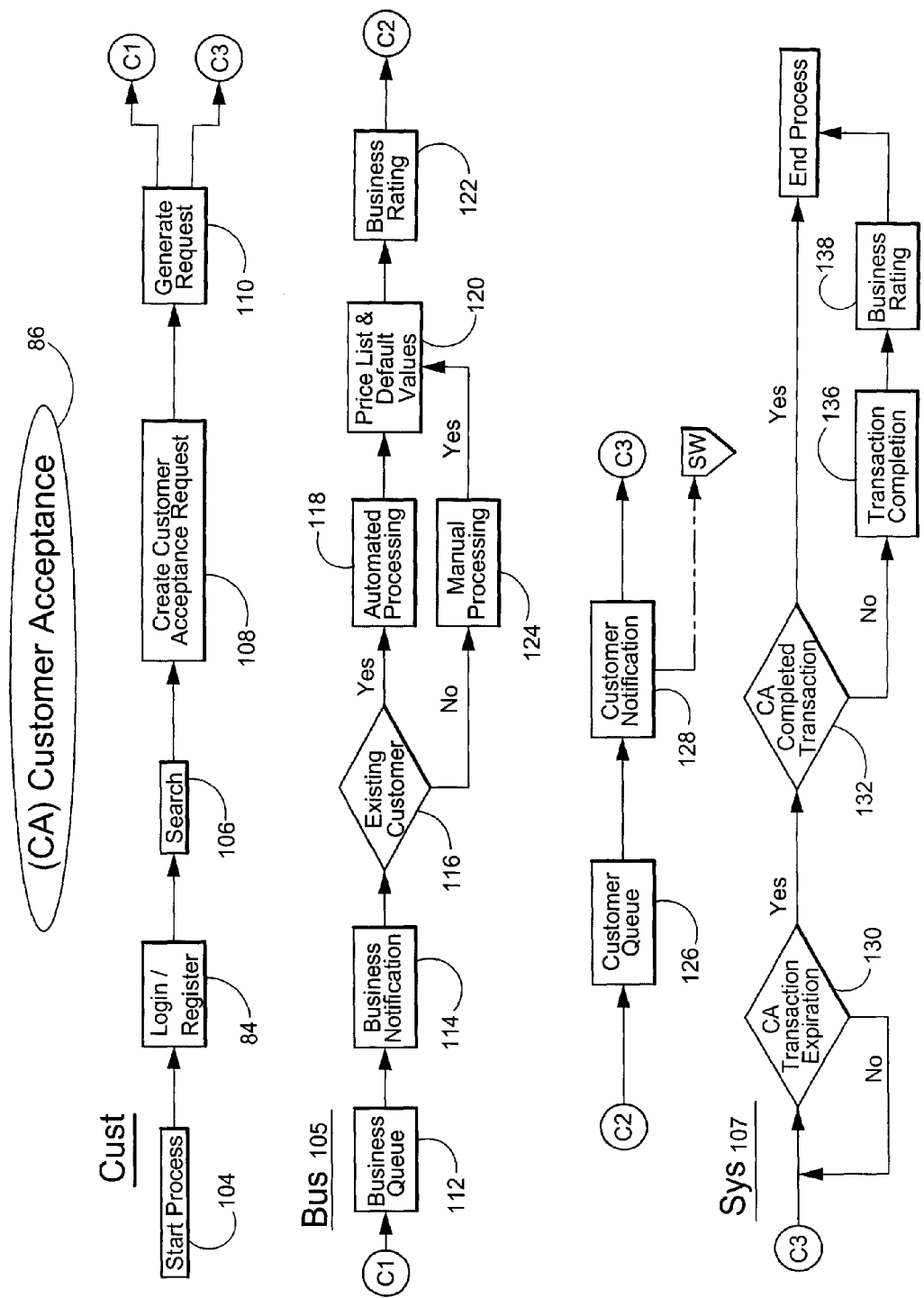
FIG. 7 diagrammatically illustrates a flowchart and functional modules for the customer acceptance (CA) routine.

Summary of Customer Acceptance CA System (CA) Customer Acceptance process 86 is shown in FIG. 7. The CA process summary follows. Login/Register 84. Registered User logs in or proceeds to registration process to become member of this SCM search engine web site. Registration is permitted for Businesses (for B2B transactions), Professionals (for B2B transactions), NPO Organization (for B2B and B2C transactions), Government Organizations (B2B transactions), and Individuals (for B2C transactions).

Search & Advanced Search 106. Specification of search attributes for subsequent execution of search actions through SCM search engine database, with the purpose of finding product and services with such attributes. Attributes comprise, among others, UNSPSC, ISO, GTIN, GLN, technical words or characteristics included as part of product/service registration process. Create Customer Acceptance Request 108. Registered entity-user creates a customer acceptance request to a pre-selected list of destination entities (Professionals, Businesses) for the purpose of becoming a new customer for target vendor entities. Approved CA request will enable originator to further request service withholding. See FIG. 8A. Generate Request 110. Registered Entity-user from originating entity releases the request to the SCM search engine web site to transfer this request to destination entity (Professionals, Businesses). Business Queue 112. A customer acceptance transaction is generated in the destination entity queue (Professional, Business, NPO) to be managed by destination entity. Business Notification 114. Search engine web site generates an e-mail message notification to the operating e-mail address of registered destination entity (Professional, Business). Existing Customer 116. Operational Entity-user from a destination entity determines if the request comes from a new customer or from existing customer. Operational Entity-user then assigns processing category for subsequent service withholding requests. The request is automated for older customers and manual for new customers. Automated Processing 118. Operational entity-user from destination entity accepts the new customer. A new customer is separated from existing customers who have maintained regular business operations with vendor prior to site registration.

Manual Processing 124. Operational entity-user from destination entity accepts the new customer and assigns a processing CA category to the user record in order to manage on a case-by-case basis future service withholding requests. Price List & Default Values 120. Operational entity-user from destination entity assigns a price list and other default processing values to manage future service withholding requests. Business Rating 122. Search engine web site automatically rates destination entity (Professional, Business) based on transaction completion and time demanded for completing the process. Customer Queue 126. A response for a customer acceptance transaction is generated in the originator entity queue (Individual, Professional, Business, NPO, Gov) for final status notification. Customer Notification 128. Search engine SCM web site generates an e-mail message notification to the operating e-mail address registered for that purpose in the transaction originator entity (Individual, Professional, Business, NPO, Gov). Transaction Expiration 130. Search engine web site evaluates on a daily basis if customer acceptance CA transaction has expired. This is a system default time countdown (or count-up). Completed Transaction 132. Search engine web site determines if customer acceptance transaction was fully processed by destination entity. Transaction Completion 136. Search engine web site finalizes the processing of customer acceptance transaction.

Customer Acceptance Details

Further details of the customer acceptance CA module 86 in FIG. 7 is provided herein. A customer or person seeking to buy G-S enters at segment 103 at start process module 104. The user is transferred to a log in and registration module 84 discussed earlier in connection with FIG. 6. A search module is activated in functional block 106 which looks through goods or services database 22. Alternatively, or in addition, database 22 may be linked to the G-S index 24 which is a link to G-S database 32 and G-S database 38 from vendors A and B. Functional block 108 is a customer acceptance (CA) request. This customer acceptance request takes inquiries from the user to define information sufficient for the vendor to determine whether the vendor wants to sell the goods or services to the customer. The system generates a CA request at module 110. The system then splits into jump points C1 and C3. Jump point C3 leads to system segment 107. Jump point C1 leads to business segment 105.

Business segment 105 starts by placing the customer acceptance CA request in the queue for the vendor business in function block 112. Step 114 notifies the business of the customer acceptance request. Decision 116 determines whether the customer has been previously accepted or not by the vendor. If the YES branch is taken, the system automates the processing in function block 118 and presents a customer specific offer record or a default offer record. Functional blocks 108, 110, 112, 114, 118 and 124 represent the CA acceptance notice module. Step 120 recognizes that some customers, even if those customers are existing customers for the vendors, are not entitled to special discounts or payment terms or delivery protocol. Therefore, the system maintains a default offer record for each G-S which includes a detail description of the G-S as well as the price, payment terms, conditions, delivery data, and set aside or reservation parameters. Other data structures may be used. In addition, the system may have a customer specific offer record with discounted, similar information. However, in a more efficient system, the default offer record would represent the standard "off the shelf price" and terms for the goods or services. The record display module presents data from the default or other G-S record to the user. See FIGS. 4 and 5. The customer specific record may be a certain percentage discount from the default. The following Default Offer Record Table provides an example of a default record.

| Default Offer Record Table |
| --- |
| Description of good - service |
| Brand name |
| Unit |
| Product - service code (SIC, SKU, etc.) |
| Vendor A, price, pmt terms, delivery time, set-aside parameters |
| Delivery cost calculator |
| Vendor B, same sub-record |

Rather than repeat all of the information for the customer specific record, the following Vendor Profile and G-S Discount Table provides a shorthand database solution for providing specific customer discount for approved or accepted customers.

| Vendor Profile + G-S Discount Table |
| --- |
| Name, address, website, email, phone contact person |
| Store locations + phone + email etc. |
| Public Discount XX % off default |
| CA preference level C xx-0.25% off |
| CA preference level B xx-0.5% off |
| CA preference level A xx-2.0% off |
| Quantity threshold A, B, C is $1,000; 2,000; 3,000 |
| Reserve levels A, B, C are 2 days, 4 days, 7 days |
| Reserve Q _____, _____, _____ |
| Reserve Deposit Amounts A, B, C are 10%-30% |

The discount table includes vendor data as well as store location and various discount levels. For example, a customer acceptance preference level C has only a 0.25% discount from the public price XX. CA preference level B is 0.5% discounted from the public posted price. CA preference level A is a 2.0% discount. A is the most preferred customer. The customer specific offer record may require that the specific customer purchase a certain quantity Q of goods or services at each preference level in order to achieve the discount for that level. Therefore, for CA preference level C (0.25% discount), the quantity threshold is $1,000.00. To obtain the highest discount (2.0%), CA preference level A must purchase $3,000.00 worth of goods or services. Further, the set aside for the customer specific record may also be keyed to the CA preference level. For example the CA set aside preference level for level A is two days whereas the CA preference level C is seven days. There may be limits, both maximum and minimum, for the reserve permitted for each particular customer. Therefore, reserve or withheld quantities are shown for each preference level.

| Set-Aside Withholding or Reservation Table |
| --- |
| Vendor ID |
| Product code - system wide |
| Product code - vendor specific |
| Q-(Quantity min'm-max'm) |
| set-aside time (T-SA) from confirm |
| delivery date (min'm-max'm) |
| deposit req'd (time for deposit % purchase, min'm-max'm) |
| cr. rating for customer req'd |

Additionally, there may be a requirement that the prospective customer, if that customer wants to reserve or withhold certain goods or services, be required to pay a good faith deposit. The deposit reserve amounts for preference levels A, B and C are also shown in the customer specific record. Other database structures may be used for better efficiency.

Returning to decision block 116, if the user is not an existing customer, the system executes manual step 124 which includes electronic communication from SCM system 10 to one vendor, for example, vendor A. This may include email communications with a buried hyperlink in the email communication that opens a web page for the SMI 26 enabling the vendor to approve, disapprove or otherwise seek additional information regarding a customer. Otherwise SMI may periodically poll the central SCM server for the queue data. If the vendor believes that he will accept the customer, the YES branch is taken from manual processing step 124 and the system reverts to posting the public price or the customer specific default price in module 120. This is the record display module. In step 122, the vendor or business is rated by a rating module based upon the amount of time it takes to accept or reject a customer acceptance request from step 110. The system operator at SCM server 16 has pre-set default times which are used to track how quickly or slowly a vendor approves a customer. Fast approval of customers CA are assigned higher business ratings compared with vendors who are slow to approve a customer.

Following jump point C2, the user or customer is placed in queue in module 126. In module 128, the customer is notified of the acceptance CA and of the default pricing and the business of the vendor. The system then executes jump point C3 leading to system segment 107 or the system executes service withholding request 92 shown in connection with FIGS. 8A and 8B.

Jump point C3 activates system module 107 and decision step 130 determines whether the CA transaction has expired. The system has default time clocks for the presentation of a customer acceptance CA request to the vendor and the CA acceptance or rejectance of that customer acceptance request from the vendor. Therefore, the default time in step 130 determines whether the customer has or has not been accepted within a preset system default time frame. There are several default time modules used herein for CA, WH, SW, QT etc. If NO, the system reverts back, if YES, the system executes CA decision step 132 which determines whether the CA transaction has been complete. The CA transaction being complete is the customer acceptance by the vendor. If the decision in step 132 is YES, the process ends at module 134. If the CA transaction is not complete from decision step 132, the NO branch is taken and the CA transaction completion module 136 is noted. The business is rated in module 138.

Service Withholding SW Request Summary

Figure 8A:
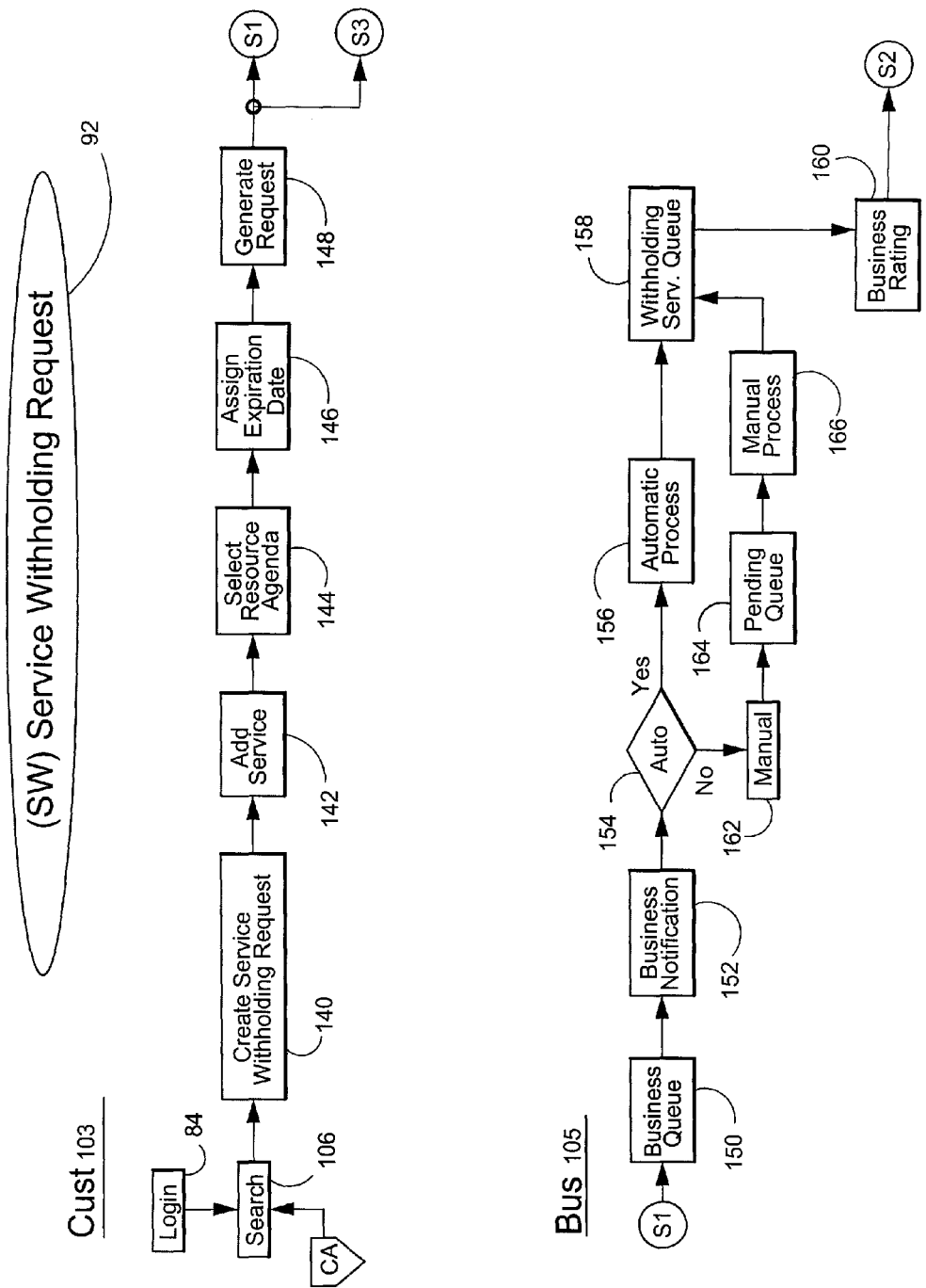
FIGS. 8A and 8B diagrammatically illustrate the service withholding (SW) request flowchart and process.
Figure 8B:
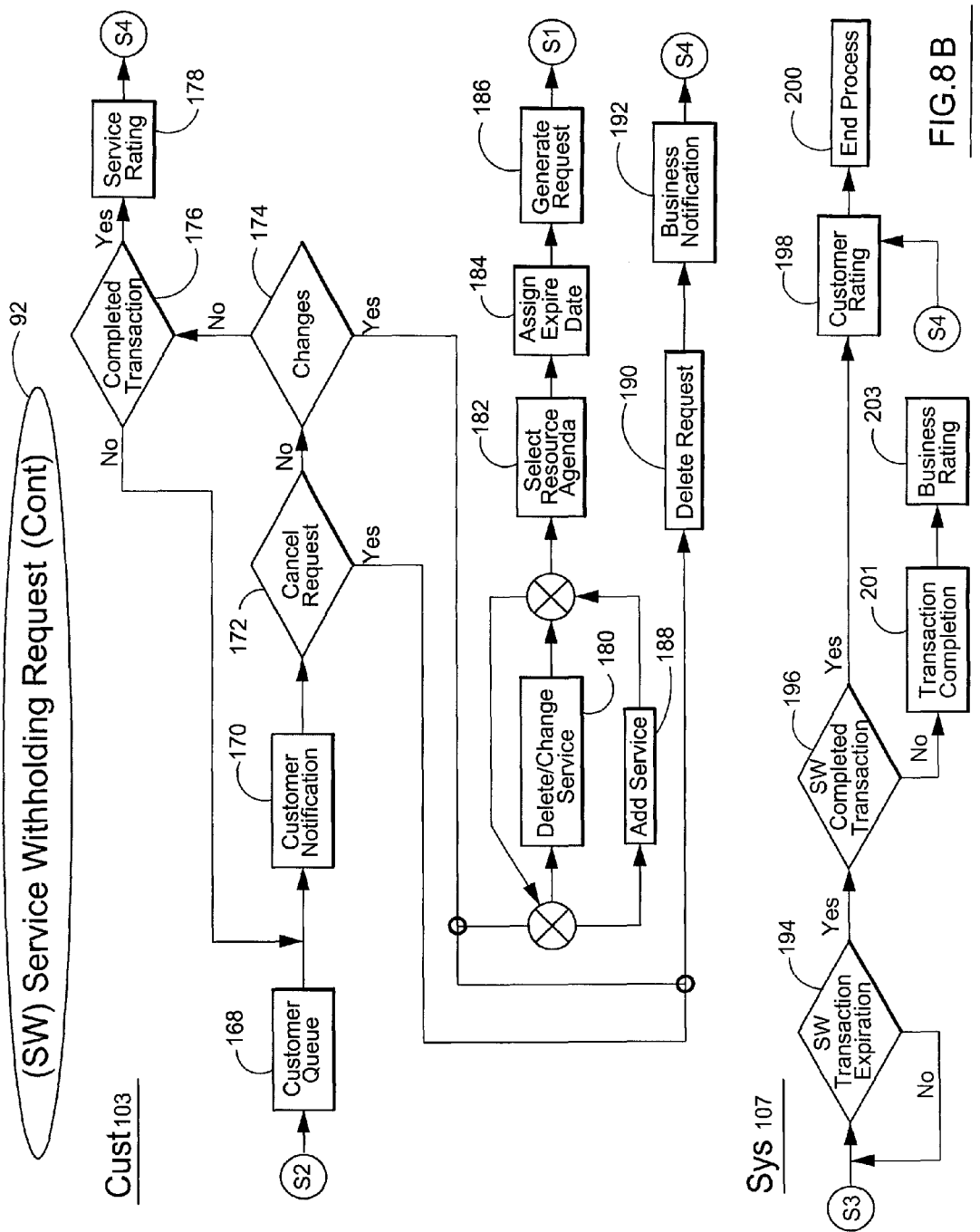

The SW request in FIGS. 8A and 8B is summarized below.

(SW)—Service Withholding Request 92. Login 84. Registered entity-user from any entity (Individual, Professional, Business, NPO, Government) logins into the SCM search engine web site. Search & Advanced Search 106. User specifies search attributes for subsequent execution of SCM search actions through search engine database, with the purpose of finding product and services with such attributes. Attributes comprise among others, UNSPSC, ISO, GTIN, GLN, technical words or characteristics included as part of product/service registration process. A product code concordance table in G-S database 22 is used. Create Service Withholding Request 140. Registered entity-user creates a service withholding SW request to initiate the inclusion of a list of services from offering entities (Professionals, Businesses) into a withholding request, with the purpose of withhold/reserve those services for a particular date and time. Request fulfillment time-day is logged. Add Service 142. Registered Entity-user continue the selection and inclusion of services as part of existing service withholding request transaction. Select Resource Agenda 144. Registered entity-user selects a resource and date for the selected service, and returns to the add service activity. Assigns Withholding Starting Date 146. Registered entity-user assigns a starting date in accordance with destination entity (Professionals, Businesses) standards for WH transaction processing expiration and which accounts for processing delays. Generate Request 148. Registered Entity-user releases the request to make search engine web site to transfer this request to destination entity (Professionals, Businesses). Business Queue 150. A service withholding request transaction is generated in the destination entity queue (Professional, Business) to be managed by destination entity. Business Notification 152. Search engine web site generates an e-mail message notification to the operating e-mail address of registered destination entity (Professional, Business). Automatic Process—Preferred Customer 154. Operational entity-user from destination entity accepts the customer and process transaction using automated processing functionality. See SMI 44. Manual Process—Normal Customer 162. Operational entity-user from destination entity accepts SW transaction request to be manually managed on a case-by-case basis. Automatic Process 156. Search engine web site automatically processes the SW request based on price list & resources assigned for preferred customers in the destination entity (Professional, Business). Pending Queue 164. Pending transaction goes to a pending request queue and to destination entity (Professional, Business) until it is treated and managed by manual process. Manual Process 166. Operational entity-user from destination entity accepts the SW request and assigns a resource, date and time. Service Withholding Queue 158. Service withholding transactions is queued into destination entity database until service is fully rendered. Business Rating 160. Search engine web site automatically rates destination entity vendor (Professional, Business) based on SW transaction completion and time demanded for completing the process.

Customer Queue 168. A response for a service withholding transaction is generated in the originator entity queue (Individual, Professional, Business, NPO, Gov) for final status notification. Customer Notification 170. Search engine web site generates an e-mail message notification to the operating e-mail address registered for that purpose in the SW transaction originator entity (Individual, Professional, Business, NPO, Gov). Cancel Request 172. If customer decides to cancel the service withholding request, module 172 executes the function. Changes 174. Is there any change on date and time for service requested? Completed Transaction 176. Was the transaction completed? Service Rating. Registered Entity-user from originating entity (Individual, Professional, Business, NPO, Gov) is entitled to rate the service offered, given, rendered by vendor destination entity (Professionals, Businesses). Delete/Change Service 180. If there is any change on services included as part of service withholding request, the registered entity-user deletes or changes included items as needed. Delete Request 190. Registered entity-user from originating entity (Individual, Professional, Business, NPO, Gov) deletes the service withholding request as a consequence of re-scheduling or cancellation. Transaction Expiration 194. Search engine web site evaluates on a daily basis if service withholding transaction has expired. Completed Transaction 196. Search engine web checks if SW transaction was fully completed by origination entity (Individual, Professional, Business, NPO, Gov). Transaction Completion 201. Search engine web site finalizes an execution process assigning the status of process to become part of processing statistics. Customer Rating 198. Search engine web site automatically rates buyer originator entity (Individual, Professional, Business, NPO, Gov) based on SW transaction completion and time demanded for completing the process.

Service Withholding Request Details

The service withholding (SW) request module 92 is shown in FIGS. 8A and 8B.

The withholding request is a reservation system or a means for setting aside G-S for the customer. Therefore, FIGS. 8A and 8B relate to a request by a customer to designate, reserve, or set aside certain services for a defined period of time such that the customer can plan to integrate those G-S into a larger project. In a similar manner, withholding request 94 in FIGS. 10A and 10B relates to the set aside for goods.

The user logs in at step 84 and conducts a search in step 106. The user may also enter search 106 from the customer acceptance Ca module. Function 140 creates a service withholding SW request from the customer. First, the customer must identify the service displayed to the customer by a SCM search (a record display module), then, the customer must identify with particularity the amount of service he or she needs and the delivery time and potentially the completion time of the service. Module 142 adds the service to a virtual shopping cart for the user. Step 144 enables the user to select what additional resources are necessary for that service. For example, in conjunction with a home painting event, the user may reserve a particular paint for the home and then reserve the services of a painter for that same project. Function block 146 assigns an expiration date for the service. In other words, a service must be begun or, in another sense, completed by the assigned expiration date. Multiple dates may be logged in the SCM 10. The system in step 148 generates a request to the vendor and jump point S1 goes to business segment 105 and the request is put in a business vendor queue 150. The system notifies the vendor or business in step 152. In step 154, determination is made whether the customer has been previously accepted (CA) and whether the request for withholding falls within the parameters established by the vendor generally for such request. These are reservation modules. As discussed earlier in connection with the vendor profile G-S Discount Table, there are parameters for the set aside or reservation. If the parameters are met, the YES branch is taken and the system automatically process the withholding request in block 156. In step 158, the withholding service request goes into a queue and the business vendor is rated in step 160. The queue is processed by SMI 44. Alternatively, the queue is processed manually at the SCM 16 under the vendor profile or under the customer profile.

Returning to decision step 154, if the service request withholding does not meet predetermined parameters, the NO branch is taken and step 162 contemplates a manual SW determination. The service withholding request is placed in a vendor queue at step 164 and the manual process continues in step 166 which engages a communication, typically email communication, between the vendor and potentially the consumer. Alternatively, the queue is posted to the vendor (or customer) profile via the SMI 26 and the vendor (or customer) manually completes the function. The CA function may permit the vendor to view the customer profile. These are SCM communications modules. Once successful, the withhold request is posted in the vendor queue in step 158. From jump point S2 the system moves to customer segment 103 and the customer is placed in a queue 168. The customer is notified in step 170 of the withholding service request. The SCM facilitates withholding requests by multiple communications to the buyer and vendor. Decision 172 determines whether the withhold request has been cancelled. If NO, the system executes decision step 174 which determines whether the user has made changes to the withholding request. If NO, decision step 176 determines, from the system standpoint, whether the withholding request transaction has been complete.

If the event is complete, the YES branch is taken and the system executes a vendor rating in step 178. If the vendor has completed the withholding request acceptance within a system default time, the vendor's rating is increased. Buyer input SW times may be used. If not, the vendor's rating is decreased. Returning to decision step 172, if the cancelled request is positive, the YES branch is taken and the request for withholding is deleted in step 190. If the YES branch is taken from changes decision 174, the system then either deletes or changes the service in step 180 or adds a service in step 188. From the change service module 180 or add service module 188, the system executes step 182 which enables the system to select and plan the use of the goods or services in a larger supply chain format. Step 184 assigns an expiration date to the service withholding request. Step 186 generates the SW request and sends it to the vendor as well as the user. Returning to the YES branch from cancel request 182, the system deletes the request in step 190 and notifies the business in step 192.

From notification function 192, jump point S4 leads to a customer rating function 198. This is part of the customer rating module. The customer rating is reduced for every change to a withholding request. Further reductions in the customer rating occurs if the customer deletes the service withholding request. Therefore, the system rewards vendors with higher ratings based upon accepting withholding requests and meeting those requests within both a system defined default time and within either a customer defined "demand" time or a vendor defined "default supply" time, which ever is given priority over the other by the SCM. For example, in some instances, the vendor may provide a default time for the withholding which is longer than the customer seeks the withhold time request. In this situation, the customer withholding request time takes precedents (since it is shorter) as compared with the vendor default withhold time. If the system wide default time is less than the customer defined default time, the SCM defined default take precedent. If the vendor meets the customer defined default time, the vendor's rating is raised. The rating module monitors and processes these events.

Returning to jump S3 and the system segment 103, a determination is made by the system if a SW transaction has expired in step 194. If the withhold transaction has expired, the YES branch is taken, and decision step 196 determines whether the withhold transaction is complete. If YES, the customer is rated in functional module 198 as part of the customer rating service module. If the withhold transaction is not complete from decision step 196, the NO branch is taken and the function 201 determines whether the SW transaction is complete for the withhold. In any event, the business rating in step 103 is changed or altered based the completion or non completion of the withhold request.

Quotation Request (QT) Summary

Figure 9A:
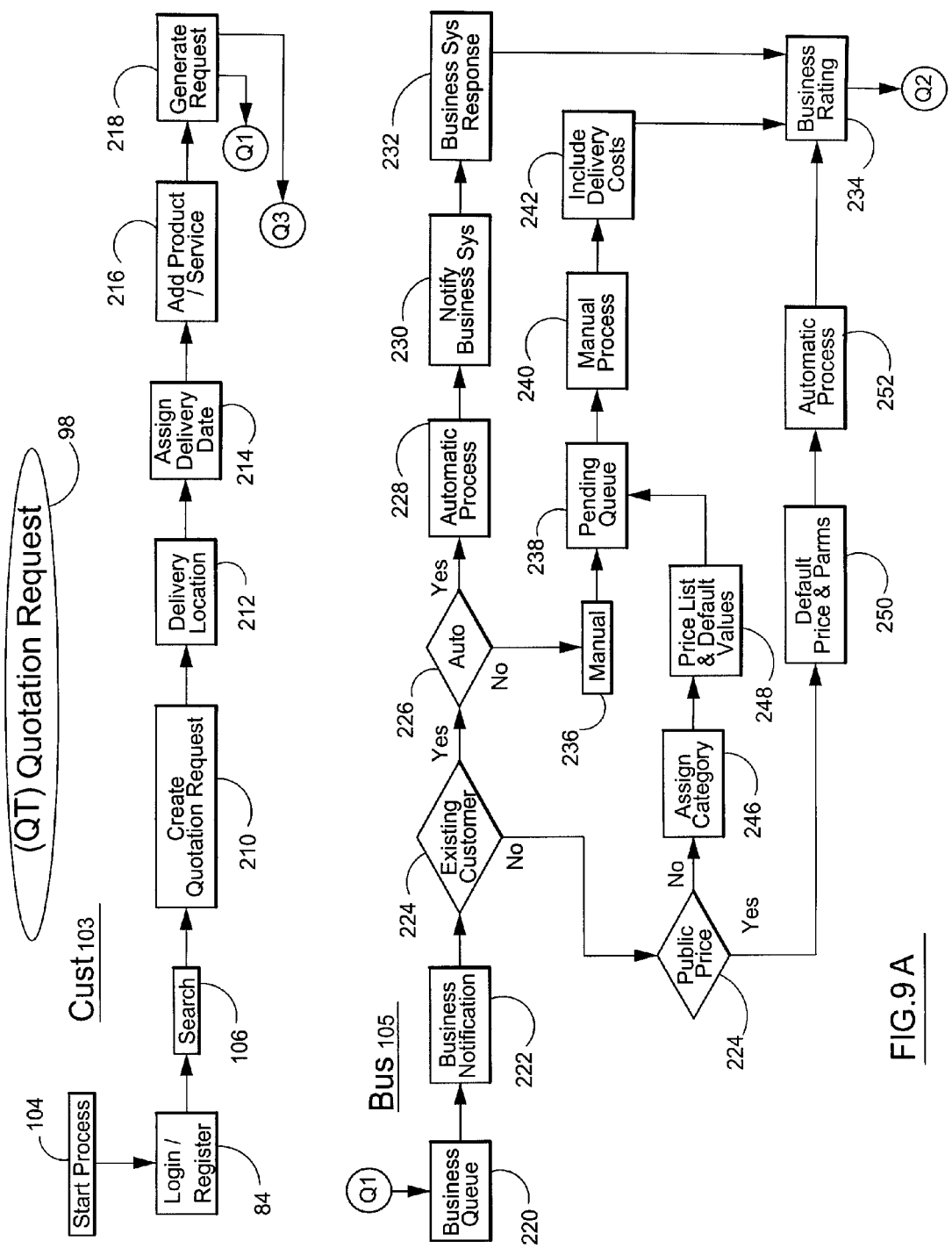
FIGS. 9A and 9B diagrammatically illustrate the quotation request (QT) flowchart and process function modules.
Figure 9B:
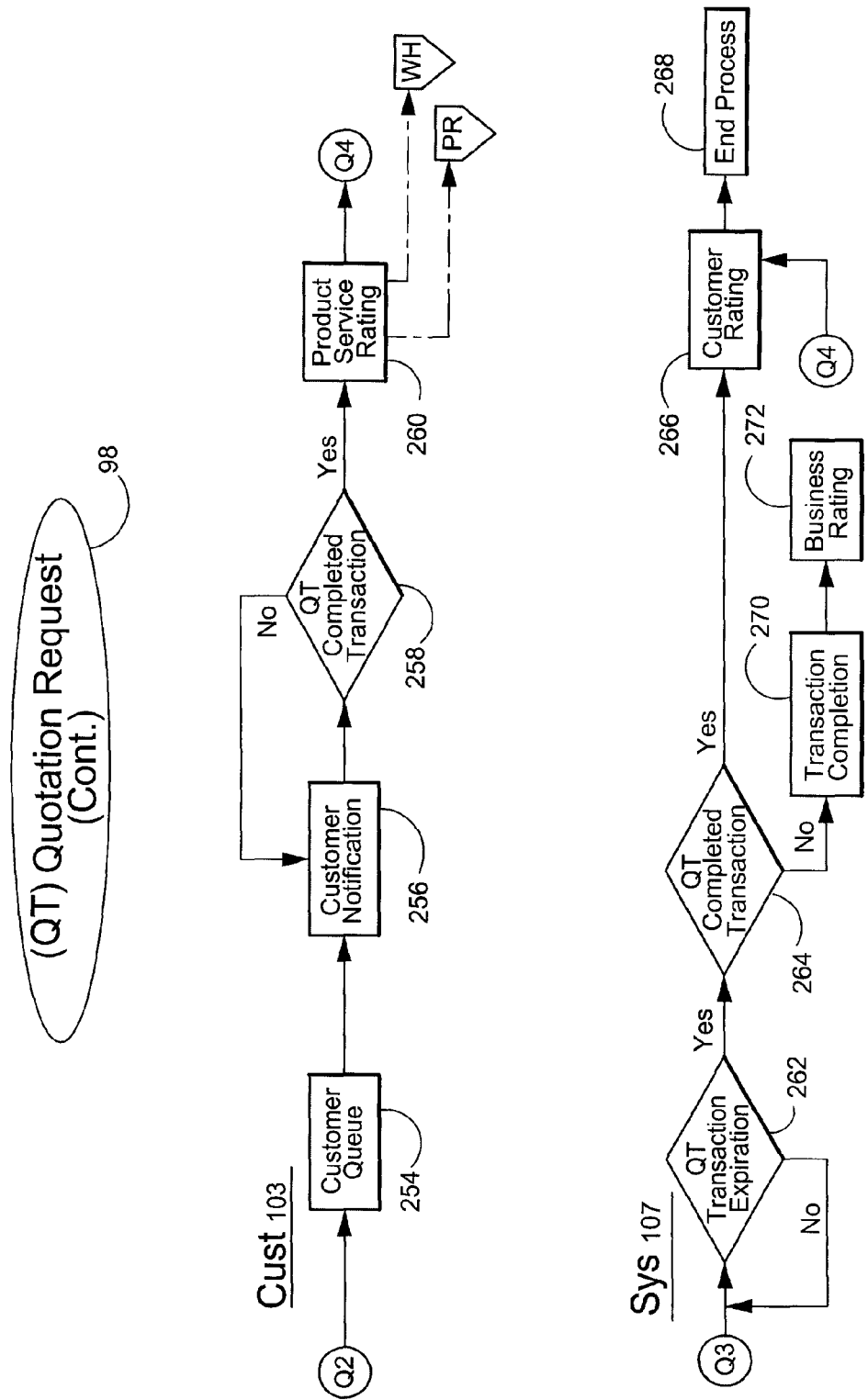

This is a summary of the QT process 98 in FIGS. 9A and 9B.

(QT) Quotation Request 98. Login/Register 84. Registered User logins or proceeds to registration process to become member of this search engine web site. Registered Users comprise Businesses (for B2B transactions), Professionals (for B2B transactions), NPO Organizations (for B2B and B2C transactions), Government Organizations (for B2B transactions), Individuals (for B2C transactions). Search & Advanced Search 106. Specification of SCM search attributes is made for subsequent execution of search actions through SCM search engine database, with the purpose of finding product and services with such attributes. Attributes comprise, among others, UNSPSC, ISO, GTIN, GLN, technical words or characteristics included as part of product/service registration process. Create Quotation Request 210. Registered entity-user creates a quotation request to initiate the inclusion of a list of products and services from offering entities (Professionals, Businesses) to determine Product/Service price and become customer of destination entity. Delivery Location 212. Registered Entity-user assigns a delivery location from registered branches/locations, to determine where products should be delivered or services should be rendered for newly created Quotation request transaction. Assigns Delivery Date 214. Registered entity-user determines and assigns a delivery date in accordance with standard transaction processing delay from destination entities (Professionals, Businesses). System defaults may control unrealistic user input delivery dates. Add Product/Service 216. Registered Entity-user continues the selection and inclusion of products and services as part of newly created quotation request transaction. Generate Request 218. Registered Entity-user releases the QT request to make SCM search engine web site to transfer this QT request to vendor destination entity (Professionals, Businesses).

Business Queue 220. A quotation request transaction is generated and posted in the destination entity queue (Professional, Business) to be managed by destination entity. Business Notification 222. Search engine web site generates an e-mail message notification to the operating e-mail address of registered destination entity (Professional, Business). Existing Customer 224. Operational Entity-user from destination entity determines if the request comes from a new customer (Manual) or from old customer (Automatic) and assigns a processing category. Automatic Process Preferred Customer 226. Operational entity-user from destination entity accepts the customer (CA process) and processes transaction using automated processing functionality. Automatic Process 228. Search engine web site automatically processes the request based on price list & values assigned for preferred customers of destination entity (Professional, Business). Notify Business System 230. If destination entity is capable of managing that transaction using their own systems, the search engine web site sends a formatted message to destination entity system application for the purpose of processing quotation transaction. Business System Response 232. Destination entity processing system returns a confirmation that a quotation transaction was processed and the content of the message includes quotation information. If transaction acknowledge is not received, a notify business system process will start again. Business Rating 234. Registered Entity-user at originator entity rates destination entity (Professional, Business) based on QT transaction completion and time demanded for completing the process.

Manual Process—Normal Customer 236. Operational entity-user from destination entity accepts QT transaction request to be manually managed on a case-by-case basis. Pending Queue 238. Pending QT transactions go to a pending request queue into destination entity (Professional, Business) until it is treated/managed by manual process. Manual Process 240. Operational entity-user from destination entity accepts the QT request and assigns a price (product or service), resource, date and time (service). Include Delivery Costs 242. Registered Entity-user from destination entity includes into the displayed product list an estimated delivery cost for sending the products that are part of quotation transaction to origination entity. Public Price 224. Search engine web site checks the existence of a public price list for unregistered customers—not categorized in terms of processing methods. Assign Category 246. Registered Entity-user from destination entity checks new customer profile and approves the inclusion as a customer under Preferred or Normal categorization. Price List & Default Values 248. Operational entity-user from destination entity assigns a price list and other default processing values to manage future transaction requests. Public Price & Default Parameters 250. Search engine automated process assigns Internet public prices and default operational parameters to manage future transaction requests.

Customer Queue 254. A response for a quotation transaction is generated and posted in the originator entity queue (Individual, Professional, Business, NPO, Gov) for final status notification. Customer Notification 256. Search engine web site generates an e-mail message notification to the operating e-mail address, which was registered for that purpose in the transaction originator entity (Consumer, Professional, Business, NPO, Gov). Completed Transaction 258. Was the QT transaction completed? Product/Service Rating 260. Operational entity-user from origination entity—(Consumer, Professional, Business, NPO, Gov)—assigns a rating for products purchased and/or services rendered. An Internal search engine process finalize execution assigning the status of processed to become part of processing statistics.

Transaction Expiration 262. Search engine web site evaluates on a daily basis if quotation transaction has expired. Completed Transaction 264. Search engine web site determines if quotation transaction was fully processed by destination entity. Transaction Completion 270. Search engine web site finalizes the processing of quotation transaction. Customer Rating 266. Search engine web site automatically rates originator entity (Individual, Professional, Business, NPO, Gov) based on transaction completion and time demanded for completing the process. Manual QT data may also be gathered for this or any other rating.

Quotation Request Details

The quotation request QT module 98 begins with start process 104 and user log in 84 and search 106. In function block 210, the system generates a quotation request based upon input from a consumer. See customer computer 13 which is a client computer compared to SCM server 16 in FIG. 1. Step 212 obtains information from the customer's client computer as to the delivery location. Step 214 either assigns a delivery date or obtains information from the user or the vendor for a delivery date. The SCM processes QT delivered data using rule-based algorithms. Step 216 adds or alters the QT product or service. Step 218 generates requests that, from jump point Q1, executes step 220 which places the request in the vendor or business queue. The business is notified in step 222 and a determination is made in decision step 224 whether the user is an existing customer. An "existing customer" is a registered user. The existing customer need not be an "accepted customer" noted in FIG. 7. If YES, the system executes decision step 224 which determines whether the registered customer routine should be automated. This automation is based upon a number of factors, primarily whether the customer is registered and whether the vendor has an automated "customer import" data function. Other automation factors may be employed. If YES from decision 226, the system executes automated process 228 and notifies the vendor in step 230. This QT-CA notification may be through a queue populated through the SMI of the SCM server 16 directed to vendor A or vendor B or may be an email sent to vendor A or vendor B with a hyperlink back to an SMI interface on server 16. In any event, vendor or business in step 232 provides a SCM response or acknowledgment (ack). If there is no acknowledgment within a certain time, the system time clock times out and an error message is generated and this affects the business rating function 234. Returning to decision step 226, this determines whether an automatic CA-QT process or a manual process should be taken. The manual process 226 is returned from the NO branch. The manual process posts a note to the vendor queue at step 238 and the manual process continues by obtaining information from the vendor or the customer at step 240. Step 242 computes and adds the delivery cost to the QT request. This may involve a delivery cost sub-routine or module that matches the zip code of the vendor to the zip code of the consumer, as well as information regarding volume and weight and preferred shipping method, all to generate a cost factor. The cost factor is added to the price of the goods or services as discussed earlier. See record display module FIG. 4, 5. The business is rated in step 234 based upon the timeout in the manual QT processing.

Returning to decision step 224, if the inquiring party is not an existing customer, the NO branch is taken and decision step 224 determines whether the public price should be posted to the customer-inquiring party. The public price module gathers information from the G-S database 22 and posts the current price for these goods or services. If NO, step 246 assigns a category to the price and step 248 presents the processed offer data to the inquiring customer. If default price is presented, the request is put in the pending queue module 238. Returning to public price decision 224, if the YES branch is taken, the public default price and parameters are posted to the inquiring party user in step 250. These may be from the default offer record. The QT process is automated in step 252 and the business rating is assigned to the vendor in step 234.

Following jump point Q2 from FIG. 9A to FIG. 9B, the customer is placed in a queue in function block 254. The customer is notified in 256 and the system determines whether the quotation module has completed the QT transaction in decision step 258. If NO, the system loops back to customer notification 256. If YES, the system in step 260 assigns a product service rating and follows to jump point Q4 immediately prior to customer rating 266. Returning to jump point Q3 and system branch 107, a decision is made in decision block 262 whether the quotation request transaction has expired. This is a system default time to determine whether the user has properly employed the quotation request process. If YES, decision step 264 determines whether the quotation is completed. If YES, the customer is assigned a rating. This occurs in step 266. The process ends in step 268. If the customer does not complete the quotation request within a system default time, the customer rating is reduced. If the QT transaction is not complete from decision step 264, the QT transaction is forced to completion in step 270 and the business is rated in step 272. If the quotation is not accepted by the business, the business is down graded.

Summary of Withholding WH Request

Figure 10A:
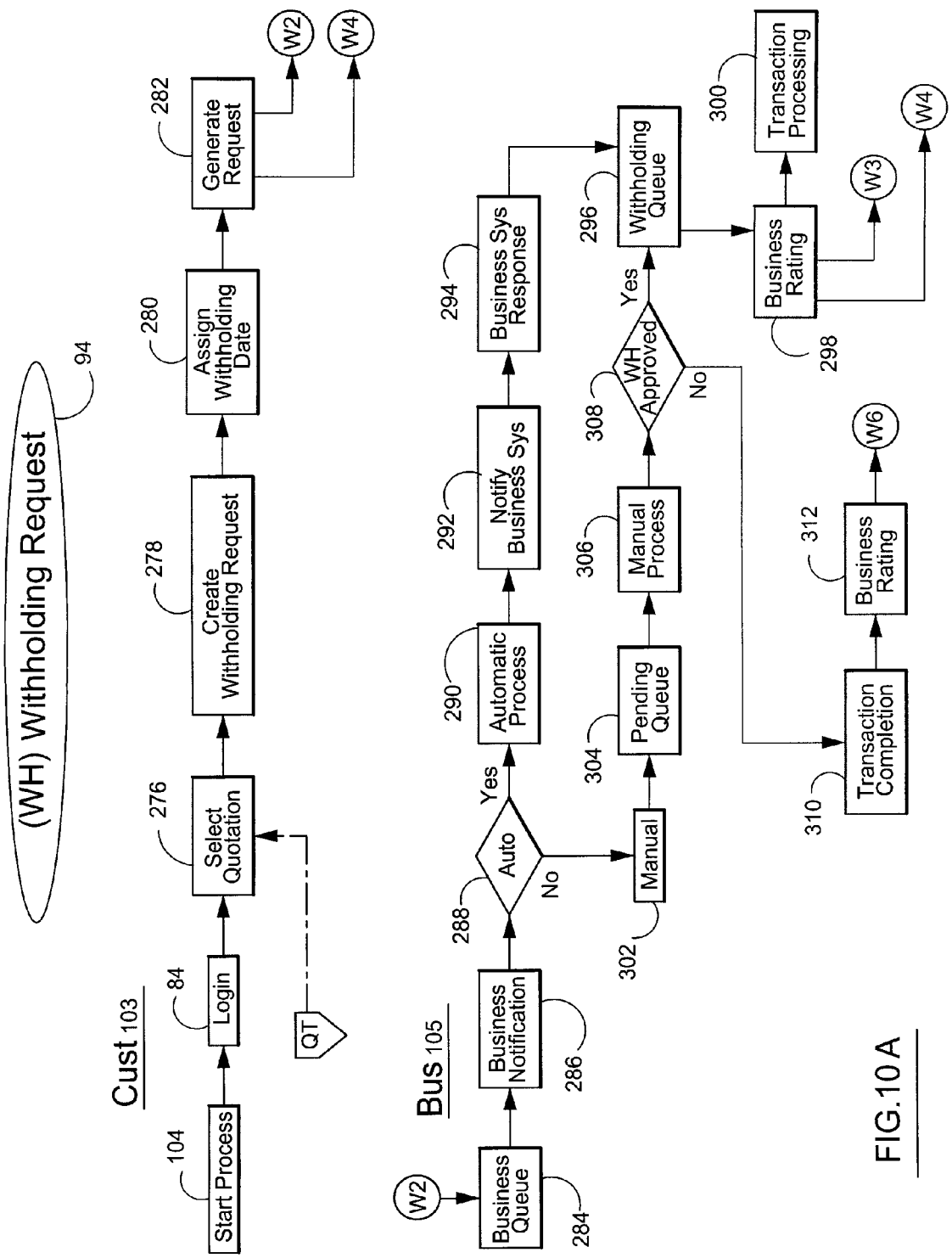
FIGS. 10A and 10B diagrammatically illustrate the withholding request (WH), sometimes called a set aside or a reservation flowchart, and the functional modules for the system.
Figure 10B:
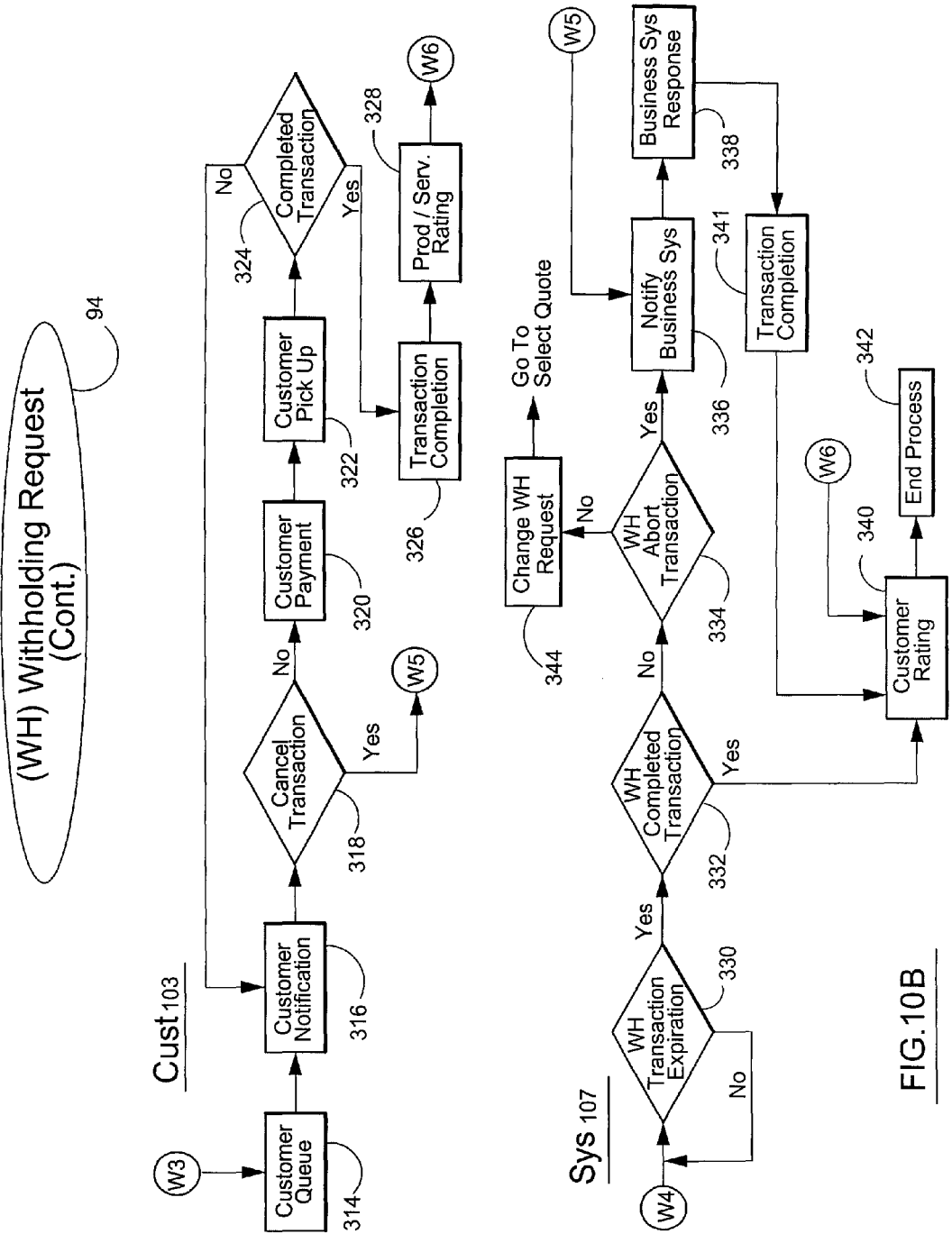

This is a summary of the withholding request process in FIGS. 10A and 10B.

(WH) Withholding Request 94. Login 84. Registered entity-user from any entity (Individual, Professional, Business, NPO, Government) logs into search engine web site. Select Quotation 276. Registered Entity-user from originating buyer entity selects an existing quotation from already created quotation transactions, for the purpose of generating a withholding request to destination vendor entity. Create withholding Request 278. Registered entity-user creates a Withholding request based on an existing quotation. Assign Withholding Starting Date 280. Registered entity-user assigns an starting date in accordance with destination entity (Professionals, Businesses) standards for transaction processing expiration and processing delays. Generate Request 282. Registered Entity-user releases the request to SCM search engine web site to transfer this WH request to destination entity (Professionals, Businesses). Business Queue 284. A withholding request transaction is generated and posted in the destination entity queue (Professional, Business) to be managed by destination entity. Business Notification 286. Search engine web site generates an e-mail message notification to the operating e-mail address of registered destination entity (Professional, Business). Automatic Process—Preferred Customer 288. Operational entity-user from destination entity accepts the customer and process transaction using automated processing functionality. Automatic Process 290. Search engine web site automatically processes the WH request based on price list and resources assigned for preferred customers of destination entity (Professional, Business). Notify Business System 292. If destination entity is capable of managing that transaction using their own systems, the search engine web site sends a formatted message to destination entity system application for the purpose of processing the withholding transaction. Business System Acknowledge 294. Destination entity processing system returns a confirmation that a withholding transaction was processed and the content of the message includes withholding information. If WH transaction acknowledge is not received, the notify business system process starts again.

Withholding Queue 296. Withholding transaction is queued into destination entity database until service is fully rendered. Business Rating 298. Registered Entity-user at originator entity rates destination entity (Professional, Business) based on transaction completion and time demanded for completing the process.

Manual Process—Normal Customer 302. Operational entity-user from destination entity accepts transaction request to be manually managed on a case-by-case basis. Pending Queue 304. Pending transactions goes to a pending request queue in the destination entity (Professional, Business) until it is treated/managed by manual process. Manual Process 306. Operational entity-user from destination entity reviews WH transaction conditions and track record of origination entity. The SCM assigns a price list (product or service), resource, date and time (service) to the G-S WH record. Approved Transaction 308. Operational entity-user from destination entity during manual process approves or rejects the WH transaction. Transaction Completion 310. Search engine web site finalizes the processing of Withholding transaction. Transaction Processing 300. The transaction is internally processed by destination entity in order to withhold those products included as part of withholding request. The origination entity will proceed to pick up those products before expiration date at Supplier location. The SCM sends out several communications to achieve 100% compliance.

Customer Queue 314. A response for a withholding request transaction is generated in the originator entity queue (Individual, Professional, Business, NPO, Gov) for final status notification. Customer Notification 316. Search engine web site generates an e-mail message notification to the operating e-mail address registered for that purpose in the transaction originator entity (Individual, Professional, Business). Cancel Transaction—Customer 318. Operational entity-user from origination entity (Individual, Professional, Business, NPO, Gov) reviews transaction and continues processing or cancels the transaction. Customer Payment 320. Individual entity or personnel from originating entity proceeds to pay for goods and/or services at destination entity physical location/warehouse. Customer Pick Up 322. Individual entity or personnel from originating entity proceeds to pick up goods and/or receive services in accordance with transaction request specifications. Completed Transaction 324. Was the transaction completed? Product & Services Rating 328. Registered Entity-user at originating entity rates destination entity (Professional, Business) based on product/service quality and customers expectations. An Internal search engine process finalizes execution assigning the status of process to become part of processing statistics.

Transaction Expiration 330. Search engine web site evaluates on a daily basis if withholding request transaction has expired. Completed Transaction 332. Search engine web site determines if withholding request transaction was fully processed by destination entity. Abort Transaction 334. If transaction is aborted along the process, some of external processes should be rolled back to original conditions, specially for those communications with Business external systems. Notify Business System 336. If destination entity is capable of managing that WH transaction using their own systems, the SCM search engine web site sends a formatted message to destination entity system application for the purpose of aborting/cancelling the initial withholding transaction. Business System Response 338. Destination entity processing system returns a confirmation that a quotation transaction was processed and the content of the message includes quotation information. If transaction acknowledge is not received, a notify business system process will start again. Customer Rating 340. Search engine web site automatically rates originator entity (Individual, Professional, Business, NPO, Gov) based on WH transaction completion and time demanded for completing the process.

Withholding Request Details

Withholding request (WH) module 94 in FIGS. 10A and 10B operates in connection with goods whereas service withholding (SW) request module 92 works in connection with services. Functions may be combined or intermingled. This module starts with start process 104 and login 84. The user makes a selection of a previous quotation in step 276. Otherwise, the user may select information directly off the SCM product description screen as discussed earlier. Step 278 creates a withholding request and step 280 assigns a withholding date. This withholding date may be a vendor defined holding date or a user defined holding date or a system defined holding date and certain priorities may be assigned. A rule based priority system is used. For example, if the vendor specifies only a two day holding but the user wants a four day holding date, the vendor's holding date takes precedence. In step 282, a goods withholding request is generated and in step 284 the goods withholding request is put in vendor A business queue. In step 286 the vendor is notified and a decision is made in step 288 whether the process should be automated or conducted manually. The automated WH process assumes that the customer has been registered user data is uploaded to the vendor. If YES, the decision branch leads to automatic process function 290 and the business is notified in 292 and a response is obtained from the business vendor in step 294. Registered user data is uploaded to the vendor. This is a communications module. The system then places the order in a withholding queue in step 296. The withholding queue would be part of the G-S database 22 in FIG. 1. From withholding queue 296, the business is rated in function block 298 and the WH transaction is processed in step 300.

Returning to decision step 288, if the system in process is not automated, the system activates a manual function 302. The manual function places the WH data in a queue in function 304 and the manual process is executed in module 306. Based upon approval of the withholding request by the vendor as determined in decision block 308, the YES branch leads to withholding queue 296. The CA process may be activated about WH request 308. The NO branch leads to a determination whether the WH transaction is complete in function block 310. The business is rated in function block 312. Going to jump point W3 in customer segment 103, after business rating module 298 in FIG. 10A, the WH information is placed in customer queue in step 314. The customer is notified in step 316 and a decision is made in step 318 whether to cancel the WH transaction. If NO, the customer makes a payment at 320 and the customer picks up the goods at 322. A decision is made by the system in step 324 to determine whether the withholding request has been completed. If YES, the system executes step 326 which completes the WH transaction and logs the G-S database 22. The product and services are rated in step 328 and the system leads to jump point W6 to customer rating 340. The customer's rating is increased based on a completed purchase following a withholding request. The customer's rating is decreased if the purchase is not made or the withholding request time is exceeded by the customer. WH quantity is compared to PR quantity as part of the users ratings. The process ends in step 342. Returning to cancellation step 318, if the YES branch is taken, the business is notified in step 336. The response from the business is compiled by the system operator of SCM system 10 in step 338. The WH transaction completion is logged in step 341 which leads to customer rating 340.

From jump point 34 the system segment 107 determines whether the WH transaction time for the withhold event has expired. If YES, the system executes decision step 332 which determines whether the entire withhold event has occurred. If NO, the decision step 334 determines whether the withholding event has been aborted. If YES, the business is notified in step 336. If NO, the system changes the withholding request in step 344 and the system goes to select QT as earlier noted.

Returning to decision step 332, if the transaction withhold request has been completed, the YES branch is taken and a consumer is rated in step 340.

Figure 11A:
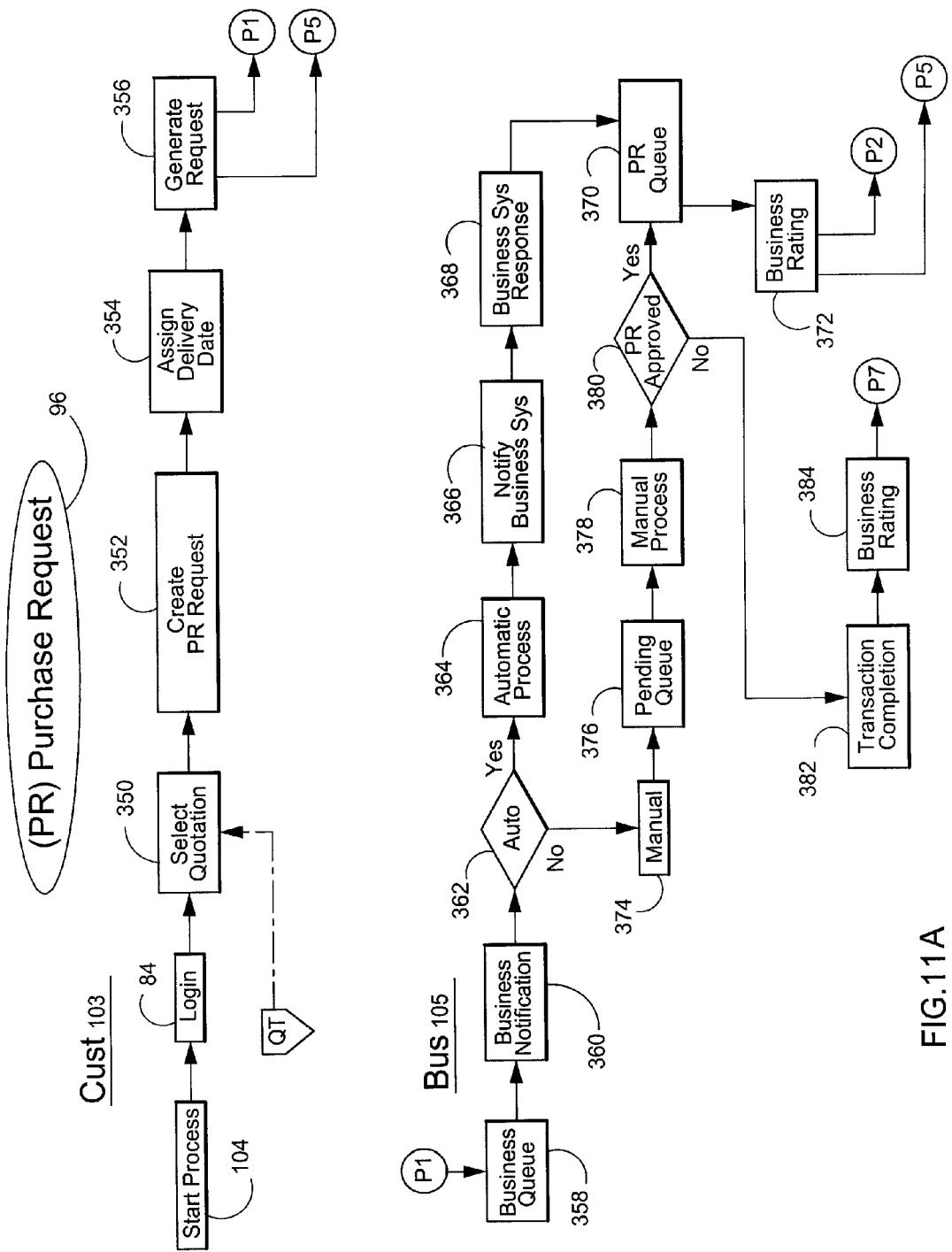
FIGS. 11A and 11B diagrammatically illustrate the purchase request (PR) routine.
Figure 11B:
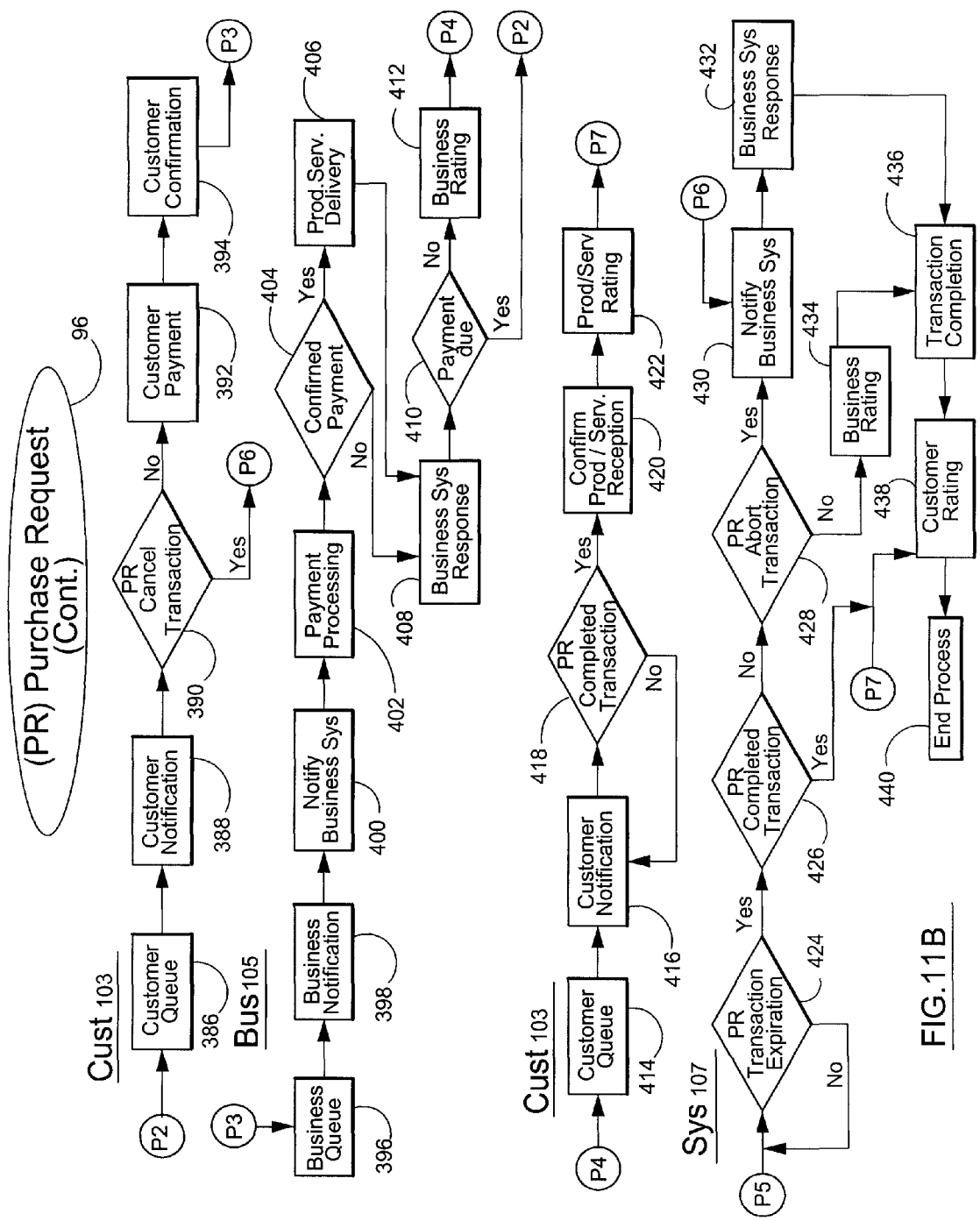

Purchase Request (PR) Summary (PR) Purchase Request 96 is disclosed in FIGS. 11A and 11B. Login 84. Registered entity-user from any entity (Individual, Professional, Business, NPO, Government) logs into SCM search engine web site.

Select Quotation 350. Registered Entity-user from originating entity selects an existing quotation QT from already created quotation transactions, for the purpose of generating a purchase request to destination entity. Create Purchase Request 352. Registered entity-user creates a purchase request based on an existing quotation request. Assign Delivery Date 354. Registered entity-user assigns a delivery date in accordance with transaction processing standards from destination entities (Professionals, Businesses) or a system default. Generate Request 356. Registered Entity-user releases the PR request to make SCM search engine web site transfer this PR request to destination entity (Professionals, Businesses).

Business Queue 358. A purchase request transaction is generated in the destination entity queue (Professional, Business) to be managed by destination entity. Business Notification 360. Search engine web site generates an e-mail message notification to the operating e-mail address of registered destination entity (Professional, Business). Automatic Process—Preferred Customer 362. Operational entity-user from destination entity accepts the customer and process transaction using automated processing functionality. Automatic Process 364. Search engine web site automatically processes the PR request based on price list & default values for preferred customers in the destination entity (Professional, Business). Notify Business System 366. If destination entity is capable of managing that transaction using their own systems, the search engine web site sends a formatted message to destination entity system application for the purpose of processing purchase transaction. Business System Response 368. Destination entity processing system returns a confirmation that a Purchase request transaction was processed and the content of the message includes purchase transaction information. If transaction acknowledge is not received, a notify business system process will start again. PR Queue—Purchase Request Queue 370. Purchase transaction is queued into destination entity database until payment is processed. Business Rating 372. Registered Entity-user at destination entity rates destination entity (Professional, Business) based on PR transaction completion and time demanded for completing the process.

Manual Process—Normal Customer 374. Operational entity-user from destination entity accepts PR transaction request to be manually managed on a case-by-case basis. Pending Queue 376. Pending transactions goes to a pending request queue into destination entity (Professional, Business) until it is treated/managed using manual process. Manual Process 378. Operational entity-user from destination entity accepts the PR request and assigns a price (product or service), resource, date and time (service). Approved Transaction 380. Operational entity-user from destination entity during manual process approves or rejects the purchase transaction. Transaction Completion 382. Search engine web site finalizes the processing of PR purchase request transaction. Customer Queue 386. A response for a purchase request transaction is generated in the originator entity queue (Customer, Professional, Business, NPO, Gov) for final status notification. Customer Notification 388. Search engine web site generates an e-mail message notification to the operating e-mail address registered for that purpose in the transaction originator entity (Individual, Professional, Business, NPO, Gov). Cancel Transaction—Customer 390. Operational entity-user from origination entity reviews PR transaction and continues processing or cancels the transaction.

Customer Payment 392. Individual entity or personnel from originating entity proceeds to pay for goods and/or services using alternative automated payment processes. Payment Confirmation 394. Individual entity or personnel from originating entity proceeds to send confirmation of payment processing in order to get goods and services be delivered from destination entity. Business Queue 396. A purchase request transaction is queued into destination entity queue (Professional, Business) for being managed by destination entity. Business Notification 398. Search engine web site generates an e-mail message notification to the operating e-mail address registered for that purpose in the registered destination entity (Professional, Business). Notify Business System 400. If destination entity is capable of managing that PR transaction using their own systems, the search engine web site sends a formatted message to destination entity system application for the processing of payment transaction. Payment Processing 402. Registered Entity-user at originating entity processes the payment made by originator entity in order to release goods and services for delivery. Confirmed Payment 404. Destination entity executes a verification of payment reception and processing. Product/Service Delivery 406. Destination entity proceeds to deliver the list of products and services included as part of original purchase request transaction. Business System Response 408. Destination entity processing system returns a confirmation that delivery process was successfully completed. Payment Due 410. If payment is due from origination entity then transaction should return to origination entity for payment execution and confirmation.

Customer Queue 414. A response for a purchase request transaction is generated in the originator entity queue (Individual, Professional, Business, NPO, Gov) for final status notification. Customer Notification 416. Search engine web site generates an e-mail message notification to the operating e-mail address registered for that purpose in the transaction originator entity (Individual, Professional, Business, NPO, Gov). Completed Transaction 418. Was the transaction completed? Confirm Product/Service Reception 420. Registered Entity-user from originating entity (Individual, Professional, Business, NPO, Gov) confirms the reception of goods and/or services. Product & Services Rating 422. Registered Entity-user at originating entity rates destination entity (Professional, Business) based on product/service quality and customer (Individual, Professional, Business, NPO, Gov) expectations.

Transaction Expiration 424. Search engine web site evaluates on a daily basis if purchase request transaction has expired. Completed Transaction 426. Search engine web site determines if purchase request transaction was fully processed by destination entity. Abort Transaction 428. If transaction is aborted along the process, some of external process should be rolled back to original conditions, specially for those communications with Business external systems. Notify Business System 430. If destination entity is capable of managing that transaction using their own systems, the search engine web site sends a formatted message to destination entity system application for the purpose of aborting initial purchase transaction. Business System Response 432. Destination entity processing system returns a confirmation that a purchase transaction was cancelled. If transaction acknowledge is not received, a notify business system process will start again. Customer Rating 438. Search engine web site automatically rates originator entity (Individual, Professional, Business, NPO, Gov) based on transaction completion and time demanded for completing the process.

Purchase Request Details

Purchase request (PR) module 96 is shown in FIGS. 11A and 11B. Start process 104 and login 84 leads to select quotation 350. In step 352, a purchase request PR is created by the user. Step 354 assigns a delivery date to the purchase of goods or services. Step 356 generates a request. From business segment 105, step 358 near jump point P1 places the purchase request in the queue for the vendor. Step 360 notifies the vendor of the purchase request. Decision step 362 determines whether the purchase can be automated. Automation is based upon an "existing registered customer" basis. If YES, the automatic process is activated 364 and the business is notified in 366. User data is uploaded. The business responds in step 368 and the purchase request PR is placed in the vendor's queue at 370. The business is rated at step 372. Returning to auto decision 362, if the NO branch is taken, the system executes manual functions 374 and places the purchase request in the vendor queue at 376. The manual process continues at 378 to obtain PR related communications from the vendor and user data to the vendor. Decision 380 determines whether the purchase PR has been approved. If YES, the purchase is placed in purchase queue 370. If NO, the system makes determination whether the purchase request is complete in step 382. In step 384, the business is rated.

Returning to FIG. 11B, and customer segment 103, from jump point P2, the customer is placed in PR queue 386 and the customer is notified in step 388. A decision is made in step 390 whether the purchase request is cancelled or not. If NO, the customer is subject to a payment event in step 392 and the customer payment is confirmed in step 394. From jump point P3, business segment 105 is activated. The purchase request and payment is placed in the PR business queue 396. The business is notified at 398 and the system responds from business communications in step 400. The system processes the payment in step 402 and confirms payment in decision step 404. If YES from step 404, the product or services is delivered in step 406. From the confirmed payment step 404, the NO branch leads to business response 408 and the output from delivery step 406 leads to business response 408. Decision step 410 determines whether a payment is still due on the goods or services purchased. If NO, the business is rated in 412, if YES, the system goes to jump point P2. The system then repeats to collect the money from the customer.

From jump point P4, the customer segment 103 executes customer PR queue 414. The customer is notified in step 416 and the system determines in step 418 whether the purchase request event is complete. If YES, in step 420 the confirmation for the product delivery or the service delivery is noted. The customer is rated in step 422. From system segment 107, decision step 424 determines whether the purchase request transaction time, that is, the default system time or user input time, has expired. If YES, a decision is made in step 426 whether the purchase request transaction event is complete. If YES, the system jumps to point P7. If NO, the system in decision step 428 determines whether the purchase request should be aborted. Communication to the parties is employed for all abort decisions. If YES, the business is notified in step 430. The abort transaction enables the SCM to accurately match the vendor's transactional database. The business response in step 432 and the PR transaction completion function 436 completes the log. The customer is rated in step 438 and the system process ends at 440. Returning to decision abort transaction 428, the NO branch leads to business rating 434.

Express Quotation XQ Summary

Figure 12:
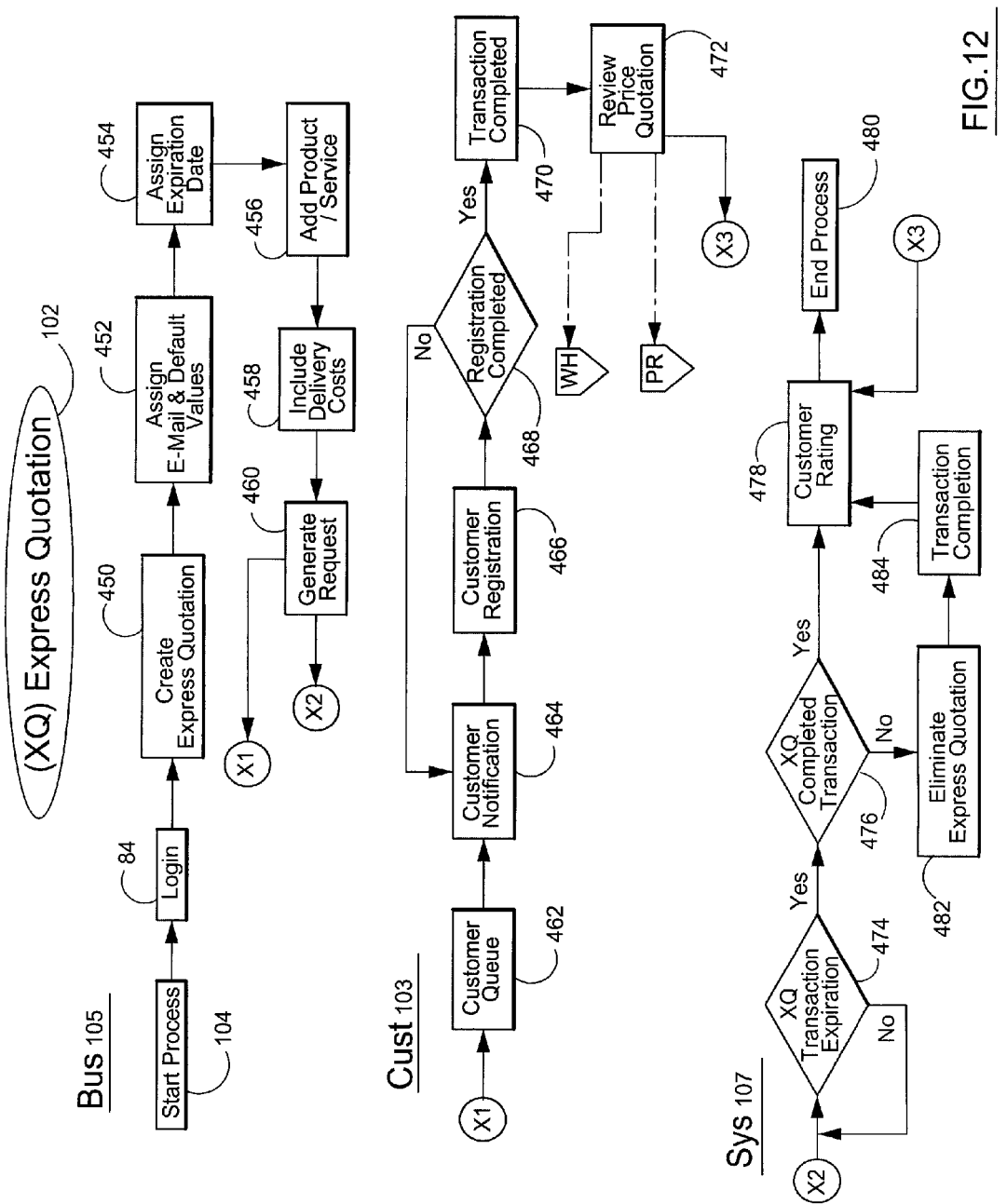
FIG. 12 diagrammatically illustrates the express work quotation (XQ) flowchart and functional module system.

This is a summary of the Express Quotation XQ process 102 in FIG. 12.

(XQ) Express Quotation 102. Login 84. Registered User logs into search engine web site. Registered User comprises Businesses (for B2B transactions), Professionals (for B2B transactions), NPO Organization (for B2B and B2C transactions), Government Organizations (B2B transactions), and Individuals (for B2C transactions). Create Express Quotation 450. Registered entity-user creates an express quotation with the purpose of sending a quotation for those users who are not yet registered with search engine web site. The invitation to become member of SCM web site is done using email capabilities with an hyperlink to the SCM search engine site in conjunction with other parameters like price list and customer categorization. Assign E-mail & Default Values 452. Registered Entity-user specifies an e-mail address of a customer that is not currently member of search engine web site. The specified customer will receive an e-mail with a link and parameters determining default values for business interaction like price list, customer categorization and credit limit. Assign Expiration Date 454. Registered entity-user assigns an expiration date for current quotation. Add Product/Service 456. Registered Entity-user continues the selection and inclusion of products and services as part of newly created Express Quotation. Include Delivery Costs 458. Registered Entity-user from destination entity includes into product list an estimated delivery cost for sending the products list that are part of quotation transaction to origination entity. Generate Request 460. Registered Entity-user releases the XQ request to make search engine web site to transfer this request to destination entity (Professionals, Businesses).

Customer Queue 462. A quotation request transaction is generated in the destination entity queue (Professional, Business) to be managed by destination entity and from there the user buyer is able to generate a Purchase/Withholding Request.

Customer Notification 464. Search engine web site generates an e-mail message notification to the e-mail address of new potential customer whose email was registered as part of Express Quotation generation process. Customer Registration 466. New customer proceeds to register and become a member of this search engine web site. New customers comprise Businesses (for B2B transactions), Professionals (for B2B transactions), NPO Organization (for B2B and B2C transactions), Government Organizations (B2B transactions), and Individuals (for B2C transactions). Registration is a prerequisite for having access to Express Quotation content. Is Registration Completed 468. Search engine web grants access to Express Quotation content plus generation of other XQ transactions if registration process has been fully completed, otherwise customer notification will continue for a limited number of occurrences. Transaction Completion 470. Search engine web site finalizes the processing of Express Quotation transaction not requiring further actions from search engine web processes. Review Price Quotation—New Customer Member 472. Operational entity-user from destination entity reviews the offerings generated by origination entity, and starts generating new transactions as, for instance, Quotation, Purchase Request or Withholding Requests.

Transaction Expiration 474. Search engine web site evaluates on a daily basis if Express Quotation transaction has expired. Completed Transaction 476. Search engine web site determines if express quotation transaction was fully processed by destination entity. Eliminate Express Quotation Transaction 482. Search engine web site proceeds to eliminate from web site database those transactions of invited customer that did not complete the registration process. Customer Rating 478. Search engine web site automatically rates originator entity (Individual, Professional, Business, NPO, Gov) based on XQ transaction completion and time demanded for completing the process.

Express Quotation Details

FIG. 12 outlines the flowchart for the express quotation (XQ). This XQ routine is a marketing campaign for vendors. Business segment starts process at 104 and login at 84. Step 450 creates an express quotation XQ from a vendor. Step 452 assigns a group of customers for target emails and default values to that express quotation. Step 454 assigns an expiration date for that express quotation. The express quotation is an offer to sell goods or services over a certain period of time. Function 456 permits the vendor to add a product or service to the express quotation. Step 458 includes and computes the delivery cost based on the location of the vendor compared with the destination of the buyer. This is a delivery cost module. Step 460 generates a XQ request. Following customer segment 103, and jump point X1, the XQ customer in step 462 is placed in a queue. This is the queue for the targeted emails to potential buyers. The XQ customer is notified in step 464. The customer is registered into the system at step 466 and a decision is made in step 468 whether the registration is complete. If not, the system returns to customer notification step 464. If YES, the system determines whether the express quotation event is complete in step 470. Step 472 reviews the price quotation which leads to withholding request function or the quotation function or the purchase request function. Alternatively, the system executes jump point X3 which leads to customer rating 478. The XQ process ends at 480. Returning to jump point X2 and system segment 107, a determination is made in step 474 whether the XQ system timeout has expired for that express quotation. If YES, the decision is made in step 476 whether the express quotation transaction is complete. If YES, the customer is rated in step 478. If NO, the system in step 482 eliminates the express quotation. The system in step 484 completes the XQ quotation transaction and leads to customer rating 478.

General Description of System Components

It is important to know that the embodiments illustrated herein and described herein are only examples of the many advantageous uses of the innovative teachings set forth herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawings, like numerals refer to like parts or features throughout the several views.

The present invention could be produced in hardware or software, or in a combination of hardware and software, and these implementations would be known to one of ordinary skill in the art. The system, or method, according to the inventive principles as disclosed in connection with the preferred embodiments, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiments, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer as would be known to one of ordinary skill in the art. The computer medium which may be used to hold or contain the computer program product, may be a fixture of the computer such as an embedded memory or may be on a transportable medium such as a disk or CD, as would be known to one of ordinary skill in the art. Further, the program, or components or modules thereof, may be downloaded from the Internet of otherwise through a computer network.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, flash memory, floppy disk, disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

In the drawings, and sometimes in the specification, reference is made to certain abbreviations. The following Abbreviations Table provides a correspondence between the abbreviations and the item or feature.

| Abbreviations Table | |
| --- | --- |
| addr | address as in IP address or mailing address or billing address |
| admin | Administrator |
| ASP | application service provider - server on a network |
| bd | board |
| Bus | business |
| CA | customer acceptance routine or module |
| CD-RW | compact disk drive with read/write feature for CD disk |
| ch | channel |
| ck | check or confirm |
| comm. | communication event or system |
| comm ch | communications channel, ans, caller Id, IP address |
| comm device | cell phones, PDAs, computers, see Table |
| cmd | command |
| cntrl | control |

-continued

| Abbreviations Table | |
| --- | --- |
| CPU | central processing unit |
| cr cd | credit card |
| DB or db | data base |
| defn | defined, such as user defined parameter |
| descript | description |
| disp | display, sometimes displ |
| distrib | distribution |
| doc | document |
| dr | drive, e.g., computer hard drive |
| ex | example |
| fnc | function, e.g., record function |
| geo | geographic location or code |
| ID | identify or identity |
| I/O | input/output |
| Indiv | individual |
| Int | Internet communication system |
| IVR | interactive voice response |
| kypd | keypad |
| loc | location |
| log | a log of a rcd session, chronologic date-time stamp |
| mbr | member registered in system |
| mem | memory |
| mess | message as in SMS or text message or email |
| mgt | management |
| ntwk | network |
| obj | object, for example, a data object |
| opt | optional |
| pgm | program |
| pmt | payment |
| PR | purchase request routine or module |
| prod | product |
| profile | all data about a member in system |
| Pty | party, such as caller party or called party |
| p/w | password |
| Q | quantity |
| QT | request for quotation routine or module |
| rcd | database record |
| re | regarding or relating to |
| reg | registered as in Reg User or Reg Member (mbr), sometimes reg'd |
| rel | release |
| reqmt | requirement or protocol, may be optional |
| rqst | request |
| rev | review |
| rpt | report |
| rt | real time or within a reasonable, somewhat predictable time after the event |
| sch | search |
| SCM | supply chain manager (system) |
| sel | select |
| serv | server, as in server-client computer set |
| S profile | summary or short form user profile |
| SMI | system management interface |
| SW | service withheld request or reservation routine or module |
| sys | system |
| t | time, usually time period |
| telecom | telecommunications system or network |
| URL | Uniform Resource Locator, x pointer, or other network locator, may be a mini-url for cell phone or PDA use |
| WH | withholding or reservation for product routine or module |

The claims appended hereto are meant to cover modifications and changes within the scope and spirit of the present invention.

What is claimed is:

1. A method of automating and managing supply chain purchases of goods and services with the use of a distributed computer system, said computer system having a server and a plurality of client computers linked together over a telecommunications network, at least one client computer operated by a vendor who offers for sale goods or services, and at least another of said client computers operated by a customer who expresses an interest in said goods or services offered by said vendor, comprising:

said server obtaining, from said vendor's client computer, data representing a plurality of goods or services offered for sale by said vendor and, for each offering, a default offer record including a description of the good or service offered for sale, price, payment terms and conditions, delivery data, and set-aside parameters for the offered goods or services;

said server obtaining, from said vendor computer, a customer acceptance notice after said customer registers its profile with said server via said customer's client computer;

said server responding to a search request from said customer's computer and presenting search results listing goods or services relationally matching said search request to said customer's computer;

said server presenting portions of said default offer record to said customer's computer upon selection of one or more of the listed goods or services from said search results by said customer; and, based upon said customer acceptance notice, said server facilitating the following transactions between said vendor and said customer:

(a-1) reserving for said customer a defined quantity of offered goods as a set-aside in accordance with set-aside parameters for the same, said defined quantity of goods being specified by at least one of said customer and said vendor;

(a-2) reserving for said customer a defined quantity of offered services, related to said goods, as a set-aside in accordance with set-aside parameters for the same, said defined quantity of services being specified by at least one of said customer and said vendor;

(b) requesting a quote from said vendor for said defined quantity of either said goods or said services or both;

(c) purchasing said defined quantity of either said goods or said services or both from said vendor;

wherein the reserving said defined quantity of goods or services is specified by both said customer and said vendor and;

wherein the server communicates with said vendor's computer and said customer's computer to confirm the reservation of said goods or services on behalf of said customer prior to the step of purchasing.

2. A method of managing supply chain purchases as claimed in claim 1 wherein said set-aside parameters for the offered goods or services in said default offer record include one or more set-aside parameters including quantity limits and hold time limits and pre-payment terms and conditions.

3. A method of managing supply chain purchases as claimed in claim 2 including said server obtaining, from said vendor's computer, a customer specific offer record including a description of the good or service offered for sale from the corresponding vendor, customer specific price, customer specific payment terms and conditions, one or more of a delivery time and a delivery cost data, and customer specific set-aside parameters for the offered goods or services, and wherein said server presents to said customer's computer, portions of said customer specific offer record upon selection of search result listed goods or services from the corresponding vendor.

4. A method of managing supply chain purchases as claimed in claim 2 wherein said delivery data includes at least a delivery time data and the method including rating said customer based upon completion of reserving said defined quantity of offered goods or services and completion of a purchase event from said vendor;

rating said vendor based upon completion of the purchase event and said delivery time data;

presenting the corresponding vendor rating data to said customer computer in conjunction with either said search results or said presentation of said default offer record; and presenting the corresponding customer rating data to said vendor computer in conjunction with a request from said server to said vendor computer for said customer acceptance notice.

5. A method of managing supply chain purchases as claimed in claim 3 wherein said delivery data includes at least a delivery time data and the method including rating said customer based upon completion of reserving said defined quantity of offered goods or services and a purchase event from said vendor;

rating said vendor based upon completion of the purchase event and said delivery time data; and presenting the corresponding vendor rating data to said customer computer in conjunction with either said search results or said presentation of said default offer record; and presenting the corresponding customer rating data to said vendor computer in conjunction with a request from said server to said vendor computer for said customer acceptance notice.

6. A method of managing supply chain purchases as claimed in claim 5 wherein the vendor rating is further based upon time for customer acceptance notice and the customer rating is based upon changes to the reserved defined quantity of goods or services and the changes to the purchase of the defined quantity of goods or services.

7. A method of managing supply chain purchases as claimed in claim 1 wherein facilitating the reservation of goods or services and the request for a quote for said goods or services and the purchase of said goods or services includes multiple communications over said telecommunications network between said server, said vendor computer and said customer computer including acknowledgments for the reservation, quote and purchase and confirmation of said reservation, quote and purchase of said goods or services.

8. A method of managing supply chain purchases as claimed in claim 1 including said server producing, to said vendor computer, a customer acceptance request on behalf of the registered customer and setting a system default time for completion of said customer acceptance notice by said vendor.

9. A method of managing supply chain purchases as claimed in claim 6 including said server producing, to said vendor computer, a customer acceptance request on behalf of the registered customer and setting a system default time for completion of said customer acceptance notice by said vendor.

10. A method of managing supply chain purchases as claimed in claim 9 including said server setting system default times for completion of said reservation, completion of said quote and completion of said purchase, said system default times set for both said customer and said vendor for the reservation, quotation and purchase events.

11. A method of managing supply chain purchases as claimed in claim 10 wherein the rating of said vendor and said customer is altered based upon completion of the reservation, quotation and purchase events within said system default times.

12. A method of managing supply chain purchases as claimed in claim 1 wherein said vendor computer maintains said default offer record for the offered goods or services and the method includes said server sending an inquiry to said vendor computer for default offer record data, said default offer record data including said description of the good or service offered for sale, price, payment terms and conditions, delivery data, and set-aside parameters for the offered goods or services.

13. A method of managing supply chain purchases as claimed in claim 11 wherein said server includes a product code concordance table providing relationships between product and service codes which include standard industrial classification product and service codes, national institute of government purchasing product and service codes, United Nations standard products and services codes, and global trade identification number product and service codes;
   said default offer record including at least one product or service code; and,
   said server obtaining a product or service code request from said customer's computer and converting said product or service code into multiple product or service codes via said concordance table.

14. A method of managing supply chain purchases as claimed in claim 13 wherein said vendor computer maintains said default offer record for the offered goods or services and the method includes said server sending an inquiry to said vendor computer for default offer record data, said default offer record data including said description of the good or service offered for sale, price, payment terms and conditions, delivery data, and set-aside parameters for the offered goods or services; and wherein
   said server includes a product code concordance table providing relationships between product and service codes which include standard industrial classification product and service codes, national institute of government purchasing product and service codes, United Nations standard products and services codes, and global trade identification number product and service codes;
   said default offer record including at least one product or service code; and,
   said server obtaining a product or service code request from said customer's computer and converting said product or service code into multiple product or service codes via said concordance table.

15. A computerized system for managing supply chain purchases of goods and services with the use of a distributed computer system, said computer system having a server and a plurality of client computers linked together over a telecommunications network, at least one client computer operated by a vendor who offers for sale goods or services, and at least another of said client computers operated by a customer who expresses an interest in said goods or services offered by said vendor, comprising:
   a server including a processor;
   a default offer record database coupled to said server processor for goods or services offered by said vendor, said default offer record including, for each offered good or service, a description of the good or service offered for sale, price, payment terms and conditions, delivery data, and set-aside parameters for the offered goods or services;
   a customer profile database coupled to said server and said processor having therein customer profile data for a plurality of registered customers;
   a customer acceptance notice module, operated by said processor, obtaining a customer acceptance notice, from said vendor computer for a registered customer interested in the vendors' offered goods or services;
   a search request module, operating with said server, said processor and said default offer record database, said search request module relationally matching a search request from said customer's computer with one or more offer records in said offer record database, and presenting search results listing goods or services to said customer's computer;
   a record display module, coupled to said search request module, for presenting portions of said default offer record to said customer's computer upon selection of one or more of the listed goods or services from said search results by said customer; and,
   means for reserving for said customer a defined quantity of offered goods as a set-aside in accordance with set-aside parameters for the same, said defined quantity of goods being specified by at least one of said customer and said vendor based upon said customer acceptance notice prior to requesting a quote;
   means for reserving for said customer a defined quantity of services related to said defined quantity of goods as a set-aside in accordance with set-aside parameters for the same, said defined quantity of services being specified by at least one of said customer and said vendor based upon said customer acceptance notice prior to requesting a quote;
   means for requesting a quote from said vendor for said defined quantity of either said goods or said services or both based upon said customer acceptance notice; and
   means for purchasing said defined quantity of either said goods or said services or both from said vendor based upon said customer acceptance notice;
   wherein said means for reserving said defined quantity includes communicating a confirmation by both said customer computer and said vendor computer.

16. A computerized system for managing supply chain purchases as claimed in claim 15 wherein said set-aside parameters for the offered goods or services in said default offer record include one or more set-aside parameters including quantity limits and hold time limits and pre-payment terms and conditions.

17. A computerized system for managing supply chain purchases as claimed in claim 16 including, as part of said default goods or services record, a customer specific offer record including a description of the good or service offered for sale from the corresponding vendor, customer specific price, customer specific payment terms and conditions, one or more of a delivery time and a delivery cost data, and customer specific set-aside parameters for the offered goods or services, and
   wherein said record display module presents to said customer's computer, portions of said customer specific offer record upon selection of search result listed goods or services from the corresponding vendor.

18. A computerized system for managing supply chain purchases as claimed in claim 17 wherein said delivery data includes at least a delivery time data and the system includes:
   a customer rating module which rates said customer based upon completion of reserving said defined quantity of offered goods or services and a purchase event from said vendor;
   a vendor rating module which rates said vendor based upon completion of the purchase event and said delivery time data; and wherein
   the record display module presents the corresponding vendor rating data to said customer computer in conjunction with either said search results or said presentation of said default offer record or presentation of said customer specific offer record; and wherein the vendor rating module includes a display presenting the corresponding customer rating data to said vendor computer in conjunction with a request from said customer acceptance module.

19. A computerized system for managing supply chain purchases as claimed in claim 18 wherein the vendor rating is further based upon time for customer acceptance notice and the customer rating is based upon changes to the reserved defined quantity of goods or services and the changes to the purchase of the defined quantity of goods or services.

20. A computerized system for managing supply chain purchases as claimed in claim 19 including an event default time module, operative with said processor, (a) to determine whether said vendor's computer sends said customer acceptance notice within a notice preset time from a customer acceptance request on behalf of the registered customer;

(b) to determine whether system default times for completion of said reservation, completion of said quote and completion of said purchase, were met by said means for reserving, means for requesting a quote and means for purchasing, said system default times being set for both said customer and said vendor for the reservation, quotation and purchase events; and said customer rating module and said vendor rating module alters the rating of said vendor and said customer based upon completion of the reservation, quotation and purchase events within said system default times, and said vendor rating module alters said vendor rating based upon whether said vendor's computer sends said customer acceptance notice within said notice preset time from said customer acceptance request.

* * * * *